US010205896B2

(12) United States Patent
Kuang et al.

(10) Patent No.: US 10,205,896 B2
(45) Date of Patent: Feb. 12, 2019

(54) AUTOMATIC LENS FLARE DETECTION AND CORRECTION FOR LIGHT-FIELD IMAGES

(71) Applicant: Google LLC, Mountain View, CA (US)

(72) Inventors: Jiangtao Kuang, Sunnyvale, CA (US); Chia-Kai Liang, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/967,076

(22) Filed: Apr. 30, 2018

(65) Prior Publication Data

US 2018/0255254 A1    Sep. 6, 2018

Related U.S. Application Data

(62) Division of application No. 14/809,022, filed on Jul. 24, 2015, now Pat. No. 9,979,909.

(51) Int. Cl.
*H04N 5/217* (2011.01)
*H04N 5/228* (2006.01)
(Continued)

(52) U.S. Cl.
CPC ....... *H04N 5/3572* (2013.01); *H04N 5/23212* (2013.01)

(58) Field of Classification Search
CPC ...... H04N 5/217; H04N 5/3572; H04N 9/045; H04N 5/361; H04N 5/365; H04N 9/3182;
(Continued)

(56) References Cited

U.S. PATENT DOCUMENTS 725,567 A    4/1903   Ives
4,383,170 A  5/1983   Takagi et al.
(Continued)

FOREIGN PATENT DOCUMENTS

CN    101226292    7/2008
CN    101309359    11/2008
(Continued)

OTHER PUBLICATIONS

U.S. Appl. No. 15/666,298, filed Aug. 1, 2017 listing Yonggang Ha et al. as inventors, entitled "Focal Reducer With Controlled Optical Properties for Interchangeable Lens Light-Field Camera".
(Continued)

*Primary Examiner* — Chia Wei A Chen

(57) ABSTRACT

According to various embodiments, the system and method disclosed herein process light-field image data so as to mitigate lens flare effects. A light-field image may be captured with a light-field image capture device with a microlens array and received in a data store. A plurality of flare-affected pixels may be identified in the light-field image. The flare-affected pixels may have flare-affected pixel values. Flare-corrected pixel values may be generated for the flare-affected pixels. Relative to the flare-affected pixel values, the flare-corrected pixel values may at least partially remove the lens flare effects. The flare-corrected pixel values may be used to generate a corrected light-field image in which the lens flare effects are at least partially corrected. The corrected light-field image may be displayed on a display screen.

22 Claims, 13 Drawing Sheets

(51) Int. Cl.
*H04N 9/64* (2006.01)
*H04N 5/14* (2006.01)
*H04N 5/357* (2011.01)
*H04N 5/232* (2006.01)

(58) Field of Classification Search
CPC ....... G06T 2207/10052; G06T 2200/21; G06T 7/557; G06T 5/007; G06T 7/11; G06T 2207/10004; G06T 5/006; G09G 2320/0626; G09G 2320/0646
See application file for complete search history.

(56) References Cited

U.S. PATENT DOCUMENTS

| | | | |
|---|---|---|---|
| 4,661,986 A | 4/1987 | Adelson | |
| 4,694,185 A | 9/1987 | Weiss | |
| 4,920,419 A | 4/1990 | Easterly | |
| 5,076,687 A | 12/1991 | Adelson | |
| 5,077,810 A * | 12/1991 | D'Luna | G06T 1/20 348/E5.091 |
| 5,251,019 A * | 10/1993 | Moorman | H04N 9/045 348/275 |
| 5,282,045 A | 1/1994 | Mimura et al. | |
| 5,499,069 A | 3/1996 | Griffith | |
| 5,572,034 A | 11/1996 | Karellas | |
| 5,610,390 A | 3/1997 | Miyano | |
| 5,748,371 A | 5/1998 | Cathey, Jr. et al. | |
| 5,757,423 A | 5/1998 | Tanaka et al. | |
| 5,818,525 A | 10/1998 | Elabd | |
| 5,835,267 A | 11/1998 | Mason et al. | |
| 5,907,619 A | 5/1999 | Davis | |
| 5,949,433 A | 9/1999 | Klotz | |
| 5,974,215 A | 10/1999 | Bilbro et al. | |
| 6,005,936 A | 12/1999 | Shimizu et al. | |
| 6,021,241 A | 2/2000 | Bilbro et al. | |
| 6,023,523 A | 2/2000 | Cohen et al. | |
| 6,028,606 A | 2/2000 | Kolb et al. | |
| 6,034,690 A | 3/2000 | Gallery et al. | |
| 6,061,083 A | 5/2000 | Aritake et al. | |
| 6,061,400 A | 5/2000 | Pearlstein et al. | |
| 6,069,565 A | 5/2000 | Stern et al. | |
| 6,075,889 A | 6/2000 | Hamilton, Jr. et al. | |
| 6,091,860 A | 7/2000 | Dimitri | |
| 6,097,394 A | 8/2000 | Levoy et al. | |
| 6,115,556 A | 9/2000 | Reddington | |
| 6,137,100 A | 10/2000 | Fossum et al. | |
| 6,169,285 B1 | 1/2001 | Petrillo et al. | |
| 6,201,899 B1 | 3/2001 | Bergen | |
| 6,221,687 B1 | 4/2001 | Abramovich | |
| 6,320,979 B1 | 11/2001 | Melen | |
| 6,424,351 B1 | 7/2002 | Bishop et al. | |
| 6,448,544 B1 | 9/2002 | Stanton et al. | |
| 6,466,207 B1 | 10/2002 | Gortler et al. | |
| 6,476,805 B1 | 11/2002 | Shum et al. | |
| 6,479,827 B1 | 11/2002 | Hamamoto et al. | |
| 6,483,535 B1 | 11/2002 | Tamburrino et al. | |
| 6,529,265 B1 | 3/2003 | Henningsen | |
| 6,577,342 B1 | 6/2003 | Webster | |
| 6,587,147 B1 | 7/2003 | Li | |
| 6,597,859 B1 | 7/2003 | Leinhardt et al. | |
| 6,606,099 B2 | 8/2003 | Yamada | |
| 6,674,430 B1 | 1/2004 | Kaufman et al. | |
| 6,687,419 B1 | 2/2004 | Atkin | |
| 6,768,980 B1 | 7/2004 | Meyer et al. | |
| 6,785,667 B2 | 8/2004 | Orbanes et al. | |
| 6,833,865 B1 | 12/2004 | Fuller et al. | |
| 6,842,297 B2 | 1/2005 | Dowski, Jr. et al. | |
| 6,900,841 B1 | 5/2005 | Mihara | |
| 6,924,841 B2 | 8/2005 | Jones | |
| 6,927,922 B2 | 8/2005 | George et al. | |
| 7,015,954 B1 | 3/2006 | Foote et al. | |
| 7,025,515 B2 | 4/2006 | Woods | |
| 7,034,866 B1 | 4/2006 | Colmenarez et al. | |
| 7,079,698 B2 | 7/2006 | Kobayashi | |
| 7,102,666 B2 | 9/2006 | Kanade et al. | |
| 7,164,807 B2 | 1/2007 | Morton | |
| 7,206,022 B2 | 4/2007 | Miller et al. | |
| 7,239,345 B1 | 7/2007 | Rogina | |
| 7,286,295 B1 | 10/2007 | Sweatt et al. | |
| 7,304,670 B1 | 12/2007 | Hussey et al. | |
| 7,329,856 B2 | 2/2008 | Ma et al. | |
| 7,336,430 B2 | 2/2008 | George | |
| 7,417,670 B1 | 8/2008 | Linzer et al. | |
| 7,469,381 B2 | 12/2008 | Ording | |
| 7,477,304 B2 | 1/2009 | Hu | |
| 7,587,109 B1 | 9/2009 | Reininger | |
| 7,620,309 B2 | 11/2009 | Georgiev | |
| 7,623,726 B1 | 11/2009 | Georgiev | |
| 7,633,513 B2 | 12/2009 | Kondo et al. | |
| 7,683,951 B2 | 3/2010 | Aotsuka | |
| 7,687,757 B1 | 3/2010 | Tseng et al. | |
| 7,723,662 B2 | 5/2010 | Levoy et al. | |
| 7,724,952 B2 | 5/2010 | Shum et al. | |
| 7,748,022 B1 | 6/2010 | Frazier | |
| 7,847,825 B2 | 12/2010 | Aoki et al. | |
| 7,936,377 B2 | 5/2011 | Friedhoff et al. | |
| 7,936,392 B2 | 5/2011 | Ng et al. | |
| 7,941,634 B2 | 5/2011 | Georgi | |
| 7,945,653 B2 | 5/2011 | Zuckerberg et al. | |
| 7,949,252 B1 | 5/2011 | Georgiev | |
| 7,982,776 B2 | 7/2011 | Dunki-Jacobs et al. | |
| 8,013,904 B2 | 9/2011 | Tan et al. | |
| 8,085,391 B2 | 12/2011 | Machida et al. | |
| 8,106,856 B2 | 1/2012 | Matas et al. | |
| 8,115,814 B2 | 2/2012 | Iwase et al. | |
| 8,155,456 B2 | 4/2012 | Babacan | |
| 8,155,478 B2 | 4/2012 | Vitsnudel et al. | |
| 8,189,089 B1 | 5/2012 | Georgiev et al. | |
| 8,228,417 B1 | 7/2012 | Georgiev et al. | |
| 8,248,515 B2 | 8/2012 | Ng et al. | |
| 8,259,198 B2 | 9/2012 | Cote et al. | |
| 8,264,546 B2 | 9/2012 | Witt | |
| 8,279,325 B2 | 10/2012 | Pitts et al. | |
| 8,289,440 B2 | 10/2012 | Knight et al. | |
| 8,290,358 B1 | 10/2012 | Georgiev | |
| 8,310,554 B2 | 11/2012 | Aggarwal et al. | |
| 8,315,476 B1 | 11/2012 | Georgiev et al. | |
| 8,345,144 B1 | 1/2013 | Georgiev et al. | |
| 8,400,533 B1 | 3/2013 | Szedo | |
| 8,400,555 B1 | 3/2013 | Georgiev et al. | |
| 8,427,548 B2 | 4/2013 | Lim et al. | |
| 8,442,397 B2 | 5/2013 | Kang et al. | |
| 8,446,516 B2 | 5/2013 | Pitts et al. | |
| 8,494,304 B2 | 7/2013 | Venable et al. | |
| 8,531,581 B2 | 9/2013 | Shroff | |
| 8,542,933 B2 | 9/2013 | Venkataraman et al. | |
| 8,559,705 B2 | 10/2013 | Ng | |
| 8,570,426 B2 | 10/2013 | Pitts et al. | |
| 8,577,216 B2 | 11/2013 | Li et al. | |
| 8,581,998 B2 | 11/2013 | Ohno | |
| 8,589,374 B2 | 11/2013 | Chaudhri | |
| 8,593,564 B2 | 11/2013 | Border et al. | |
| 8,605,199 B2 | 12/2013 | Imai | |
| 8,614,764 B2 | 12/2013 | Pitts et al. | |
| 8,619,082 B1 | 12/2013 | Ciurea et al. | |
| 8,629,930 B2 | 1/2014 | Brueckner et al. | |
| 8,665,440 B1 | 3/2014 | Kompaniets et al. | |
| 8,675,073 B2 | 3/2014 | Aagaard et al. | |
| 8,724,014 B2 | 5/2014 | Ng et al. | |
| 8,736,710 B2 | 5/2014 | Spielberg | |
| 8,736,751 B2 | 5/2014 | Yun | |
| 8,749,620 B1 | 6/2014 | Pitts et al. | |
| 8,750,509 B2 | 6/2014 | Renkis | |
| 8,754,829 B2 | 6/2014 | Lapstun | |
| 8,760,566 B2 | 6/2014 | Pitts et al. | |
| 8,768,102 B1 | 7/2014 | Ng et al. | |
| 8,797,321 B1 | 8/2014 | Bertolami et al. | |
| 8,811,769 B1 | 8/2014 | Pitts et al. | |
| 8,831,377 B2 | 9/2014 | Pitts et al. | |
| 8,860,856 B2 * | 10/2014 | Wetzstein | G06T 5/50 348/222.1 |
| 8,879,901 B2 | 11/2014 | Caldwell et al. | |
| 8,903,232 B1 | 12/2014 | Caldwell | |

(56) References Cited

U.S. PATENT DOCUMENTS

| | | |
|---|---|---|
| 8,908,058 B2 | 12/2014 | Akeley et al. |
| 8,948,545 B2 | 2/2015 | Akeley et al. |
| 8,953,882 B2 | 2/2015 | Lim et al. |
| 8,971,625 B2 | 3/2015 | Pitts et al. |
| 8,976,288 B2 | 3/2015 | Ng et al. |
| 8,988,317 B1 | 3/2015 | Liang et al. |
| 8,995,785 B2 | 3/2015 | Knight et al. |
| 8,997,021 B2 | 3/2015 | Liang et al. |
| 9,001,226 B1 | 4/2015 | Ng et al. |
| 9,013,611 B1 | 4/2015 | Szedo |
| 9,106,914 B2 | 8/2015 | Doser |
| 9,172,853 B2 | 10/2015 | Pitts et al. |
| 9,184,199 B2 | 11/2015 | Pitts et al. |
| 9,201,193 B1 | 12/2015 | Smith |
| 9,210,391 B1 | 12/2015 | Mills |
| 9,214,013 B2 | 12/2015 | Venkataraman et al. |
| 9,294,662 B2 | 3/2016 | Vondran, Jr. et al. |
| 9,300,932 B2 | 3/2016 | Knight et al. |
| 9,305,375 B2 | 4/2016 | Akeley |
| 9,305,956 B2 | 4/2016 | Pittes et al. |
| 9,386,288 B2 | 7/2016 | Akeley et al. |
| 9,392,153 B2 | 7/2016 | Myhre et al. |
| 9,419,049 B2 | 8/2016 | Pitts et al. |
| 9,467,607 B2 | 10/2016 | Ng et al. |
| 9,497,380 B1 | 11/2016 | Jannard et al. |
| 9,607,424 B2 | 3/2017 | Ng et al. |
| 9,628,684 B2 | 4/2017 | Liang et al. |
| 9,635,332 B2 | 4/2017 | Carroll |
| 9,639,945 B2 | 5/2017 | Oberheu et al. |
| 9,647,150 B2 * | 5/2017 | Blasco Claret ... H01L 27/14685 |
| 9,681,069 B2 * | 6/2017 | El-Ghoroury ......... H04N 5/225 |
| 9,774,800 B2 * | 9/2017 | El-Ghoroury ......... H04N 5/225 |
| 9,858,649 B2 | 1/2018 | Liang et al. |
| 9,866,810 B2 | 1/2018 | Knight et al. |
| 9,900,510 B1 | 2/2018 | Karafin et al. |
| 2001/0048968 A1 | 12/2001 | Cox et al. |
| 2001/0053202 A1 * | 12/2001 | Mazess ............... A61B 6/4225 378/196 |
| 2002/0001395 A1 | 1/2002 | Davis et al. |
| 2002/0015048 A1 | 2/2002 | Nister |
| 2002/0061131 A1 | 5/2002 | Sawhney |
| 2002/0109783 A1 | 8/2002 | Hayashi et al. |
| 2002/0159030 A1 | 10/2002 | Frey et al. |
| 2002/0199106 A1 | 12/2002 | Hayashi |
| 2003/0081145 A1 | 5/2003 | Seaman et al. |
| 2003/0103670 A1 | 6/2003 | Schoelkopf et al. |
| 2003/0117511 A1 | 6/2003 | Belz et al. |
| 2003/0123700 A1 | 7/2003 | Wakao |
| 2003/0133018 A1 | 7/2003 | Ziemkowski |
| 2003/0147252 A1 | 8/2003 | Fioravanti |
| 2003/0156077 A1 | 8/2003 | Balogh |
| 2004/0002179 A1 | 1/2004 | Barton et al. |
| 2004/0012688 A1 | 1/2004 | Tinnerinno et al. |
| 2004/0012689 A1 | 1/2004 | Tinnerinno et al. |
| 2004/0101166 A1 | 5/2004 | Williams et al. |
| 2004/0114176 A1 | 6/2004 | Bodin et al. |
| 2004/0135780 A1 | 7/2004 | Nims |
| 2004/0189686 A1 | 9/2004 | Tanguay et al. |
| 2004/0257360 A1 | 12/2004 | Sieckmann |
| 2005/0031203 A1 | 2/2005 | Fukuda |
| 2005/0049500 A1 | 3/2005 | Babu et al. |
| 2005/0052543 A1 | 3/2005 | Li et al. |
| 2005/0080602 A1 | 4/2005 | Snyder et al. |
| 2005/0162540 A1 | 7/2005 | Yata |
| 2005/0212918 A1 | 9/2005 | Serra et al. |
| 2005/0276441 A1 | 12/2005 | Debevec |
| 2006/0023066 A1 | 2/2006 | Li et al. |
| 2006/0050170 A1 | 3/2006 | Tanaka |
| 2006/0056040 A1 | 3/2006 | Lan |
| 2006/0056604 A1 | 3/2006 | Sylthe et al. |
| 2006/0072175 A1 | 4/2006 | Oshino |
| 2006/0082879 A1 | 4/2006 | Miyoshi et al. |
| 2006/0130017 A1 | 6/2006 | Cohen et al. |
| 2006/0208259 A1 | 9/2006 | Jeon |
| 2006/0248348 A1 | 11/2006 | Wakao et al. |
| 2006/0256226 A1 | 11/2006 | Alon et al. |
| 2006/0274210 A1 | 12/2006 | Kim |
| 2006/0285741 A1 | 12/2006 | Subbarao |
| 2007/0008317 A1 | 1/2007 | Lundstrom |
| 2007/0019883 A1 | 1/2007 | Wong et al. |
| 2007/0030357 A1 | 2/2007 | Levien et al. |
| 2007/0033588 A1 | 2/2007 | Landsman |
| 2007/0052810 A1 | 3/2007 | Monroe |
| 2007/0071316 A1 | 3/2007 | Kubo |
| 2007/0081081 A1 | 4/2007 | Cheng |
| 2007/0097206 A1 | 5/2007 | Houvener |
| 2007/0103558 A1 | 5/2007 | Cai et al. |
| 2007/0113198 A1 | 5/2007 | Robertson et al. |
| 2007/0140676 A1 | 6/2007 | Nakahara |
| 2007/0188613 A1 | 8/2007 | Norbori et al. |
| 2007/0201853 A1 | 8/2007 | Petschnigg |
| 2007/0229653 A1 | 10/2007 | Matusik et al. |
| 2007/0230944 A1 | 10/2007 | Georgiev |
| 2007/0269108 A1 | 11/2007 | Steinberg et al. |
| 2008/0007626 A1 | 1/2008 | Wernersson |
| 2008/0012988 A1 | 1/2008 | Baharav et al. |
| 2008/0018668 A1 | 1/2008 | Yamauchi |
| 2008/0031537 A1 | 2/2008 | Gutkowicz-Krusin et al. |
| 2008/0049113 A1 | 2/2008 | Hirai |
| 2008/0056569 A1 | 3/2008 | Williams et al. |
| 2008/0122940 A1 | 5/2008 | Mori |
| 2008/0129728 A1 | 6/2008 | Satoshi |
| 2008/0144952 A1 | 6/2008 | Chen et al. |
| 2008/0152215 A1 | 6/2008 | Horie et al. |
| 2008/0168404 A1 | 7/2008 | Ording |
| 2008/0180792 A1 | 7/2008 | Georgiev |
| 2008/0187305 A1 | 8/2008 | Raskar et al. |
| 2008/0193026 A1 | 8/2008 | Horie et al. |
| 2008/0205871 A1 | 8/2008 | Utagawa |
| 2008/0226274 A1 | 9/2008 | Spielberg |
| 2008/0232680 A1 | 9/2008 | Berestov et al. |
| 2008/0253652 A1 | 10/2008 | Gupta et al. |
| 2008/0260291 A1 | 10/2008 | Alakarhu et al. |
| 2008/0266688 A1 | 10/2008 | Errando Smet et al. |
| 2008/0277566 A1 | 11/2008 | Utagawa |
| 2008/0309813 A1 | 12/2008 | Watanabe |
| 2008/0316301 A1 | 12/2008 | Givon |
| 2009/0027542 A1 | 1/2009 | Yamamoto et al. |
| 2009/0041381 A1 | 2/2009 | Georgiev et al. |
| 2009/0041448 A1 | 2/2009 | Georgiev et al. |
| 2009/0070710 A1 | 3/2009 | Kagaya |
| 2009/0128658 A1 | 5/2009 | Hayasaka et al. |
| 2009/0128669 A1 | 5/2009 | Ng et al. |
| 2009/0135258 A1 | 5/2009 | Nozaki |
| 2009/0140131 A1 | 6/2009 | Utagawa |
| 2009/0102956 A1 | 7/2009 | Georgiev |
| 2009/0185051 A1 | 7/2009 | Sano |
| 2009/0185801 A1 | 7/2009 | Georgiev et al. |
| 2009/0190022 A1 | 7/2009 | Ichimura |
| 2009/0190024 A1 | 7/2009 | Hayasaka et al. |
| 2009/0195689 A1 | 8/2009 | Hwang et al. |
| 2009/0202235 A1 | 8/2009 | Li et al. |
| 2009/0204813 A1 | 8/2009 | Kwan |
| 2009/0273843 A1 * | 11/2009 | Raskar ............... G02B 27/0018 359/601 |
| 2009/0295829 A1 | 12/2009 | Georgiev et al. |
| 2009/0309973 A1 | 12/2009 | Kogane |
| 2009/0310885 A1 | 12/2009 | Tamaru |
| 2009/0321861 A1 | 12/2009 | Oliver et al. |
| 2010/0003024 A1 | 1/2010 | Agrawal et al. |
| 2010/0021001 A1 | 1/2010 | Honsinger et al. |
| 2010/0026852 A1 | 2/2010 | Ng et al. |
| 2010/0050120 A1 | 2/2010 | Ohazama et al. |
| 2010/0060727 A1 | 3/2010 | Steinberg et al. |
| 2010/0097444 A1 | 4/2010 | Lablans |
| 2010/0103311 A1 | 4/2010 | Makii |
| 2010/0107068 A1 | 4/2010 | Butcher et al. |
| 2010/0111489 A1 | 5/2010 | Presler |
| 2010/0123784 A1 | 5/2010 | Ding et al. |
| 2010/0141780 A1 | 6/2010 | Tan et al. |
| 2010/0142839 A1 | 6/2010 | Lakus-Becker |
| 2010/0201789 A1 | 8/2010 | Yahagi |
| 2010/0253782 A1 | 10/2010 | Elazary |
| 2010/0265385 A1 | 10/2010 | Knight et al. |

(56) References Cited

U.S. PATENT DOCUMENTS

| | | |
|---|---|---|
| 2010/0277629 A1 | 11/2010 | Tanaka |
| 2010/0303288 A1 | 12/2010 | Malone |
| 2010/0328485 A1 | 12/2010 | Imamura et al. |
| 2011/0018903 A1 | 1/2011 | Lapstun et al. |
| 2011/0019056 A1 | 1/2011 | Hirsch et al. |
| 2011/0025827 A1 | 2/2011 | Shpunt et al. |
| 2011/0050864 A1 | 3/2011 | Bond |
| 2011/0050909 A1 | 3/2011 | Ellenby |
| 2011/0069175 A1 | 3/2011 | Mistretta et al. |
| 2011/0075729 A1 | 3/2011 | Dane et al. |
| 2011/0090255 A1 | 4/2011 | Wilson et al. |
| 2011/0123183 A1 | 5/2011 | Adelsberger et al. |
| 2011/0129120 A1 | 6/2011 | Chan |
| 2011/0129165 A1 | 6/2011 | Lim et al. |
| 2011/0148764 A1 | 6/2011 | Gao |
| 2011/0149074 A1 | 6/2011 | Lee et al. |
| 2011/0169994 A1 | 7/2011 | DiFrancesco et al. |
| 2011/0205384 A1 | 8/2011 | Zamowski et al. |
| 2011/0221947 A1 | 9/2011 | Awazu |
| 2011/0242334 A1 | 10/2011 | Wilburn et al. |
| 2011/0242352 A1* | 10/2011 | Hikosaka ............ H04N 5/3572 348/222.1 |
| 2011/0261164 A1 | 10/2011 | Olesen et al. |
| 2011/0261205 A1 | 10/2011 | Sun |
| 2011/0267263 A1 | 11/2011 | Hinckley |
| 2011/0273466 A1 | 11/2011 | Imai et al. |
| 2011/0133649 A1 | 12/2011 | Bales et al. |
| 2011/0292258 A1 | 12/2011 | Adler |
| 2011/0298960 A1 | 12/2011 | Tan et al. |
| 2011/0304745 A1 | 12/2011 | Wang et al. |
| 2011/0311046 A1 | 12/2011 | Oka |
| 2011/0316968 A1 | 12/2011 | Taguchi et al. |
| 2012/0014837 A1 | 1/2012 | Fehr et al. |
| 2012/0050562 A1 | 3/2012 | Perwass et al. |
| 2012/0056889 A1 | 3/2012 | Carter et al. |
| 2012/0057040 A1 | 3/2012 | Park et al. |
| 2012/0057806 A1 | 3/2012 | Backlund et al. |
| 2012/0062755 A1 | 3/2012 | Takahashi et al. |
| 2012/0132803 A1 | 5/2012 | Hirato et al. |
| 2012/0133746 A1 | 5/2012 | Bigioi et al. |
| 2012/0147205 A1 | 6/2012 | Lelescu et al. |
| 2012/0176481 A1 | 7/2012 | Lukk et al. |
| 2012/0188344 A1 | 7/2012 | Imai |
| 2012/0201475 A1 | 8/2012 | Carmel et al. |
| 2012/0206574 A1 | 8/2012 | Shikata et al. |
| 2012/0218463 A1 | 8/2012 | Benezra et al. |
| 2012/0224787 A1 | 9/2012 | Imai |
| 2012/0229691 A1 | 9/2012 | Hiasa et al. |
| 2012/0249529 A1 | 10/2012 | Matsumoto et al. |
| 2012/0249550 A1 | 10/2012 | Akeley |
| 2012/0249819 A1 | 10/2012 | Imai |
| 2012/0251131 A1 | 10/2012 | Henderson et al. |
| 2012/0257065 A1 | 10/2012 | Velarde et al. |
| 2012/0257795 A1 | 10/2012 | Kim et al. |
| 2012/0272271 A1 | 10/2012 | Nishizawa et al. |
| 2012/0287246 A1 | 11/2012 | Katayama |
| 2012/0287296 A1 | 11/2012 | Fukui |
| 2012/0287329 A1 | 11/2012 | Yahata |
| 2012/0293075 A1 | 11/2012 | Engelen et al. |
| 2012/0300091 A1 | 11/2012 | Shroff et al. |
| 2012/0237222 A9 | 12/2012 | Ng et al. |
| 2013/0002902 A1* | 1/2013 | Ito ..................... H04N 5/3572 348/224.1 |
| 2013/0002936 A1* | 1/2013 | Hirama ............. H04N 5/23212 348/349 |
| 2013/0021486 A1 | 1/2013 | Richardson |
| 2013/0038696 A1 | 2/2013 | Ding et al. |
| 2013/0041215 A1 | 2/2013 | McDowall |
| 2013/0044290 A1 | 2/2013 | Kawamura |
| 2013/0050546 A1* | 2/2013 | Kano ................. H04N 5/3572 348/280 |
| 2013/0064453 A1 | 3/2013 | Nagasaka et al. |
| 2013/0064532 A1 | 3/2013 | Caldwell et al. |
| 2013/0070059 A1 | 3/2013 | Kushida |
| 2013/0070060 A1 | 3/2013 | Chatterjee et al. |
| 2013/0077880 A1 | 3/2013 | Venkataraman et al. |
| 2013/0082905 A1 | 4/2013 | Ranieri et al. |
| 2013/0088616 A1 | 4/2013 | Ingrassia, Jr. |
| 2013/0093844 A1 | 4/2013 | Shuto |
| 2013/0093859 A1 | 4/2013 | Nakamura |
| 2013/0094101 A1 | 4/2013 | Oguchi |
| 2013/0107085 A1 | 5/2013 | Ng et al. |
| 2013/0113981 A1 | 5/2013 | Knight et al. |
| 2013/0120356 A1 | 5/2013 | Georgiev et al. |
| 2013/0120605 A1 | 5/2013 | Georgiev et al. |
| 2013/0120636 A1 | 5/2013 | Baer |
| 2013/0127901 A1 | 5/2013 | Georgiev et al. |
| 2013/0128052 A1 | 5/2013 | Catrein et al. |
| 2013/0128081 A1 | 5/2013 | Georgiev et al. |
| 2013/0128087 A1 | 5/2013 | Georgiev et al. |
| 2013/0135448 A1 | 5/2013 | Nagumo et al. |
| 2013/0176481 A1 | 7/2013 | Holmes et al. |
| 2013/0188068 A1 | 7/2013 | Said |
| 2013/0215108 A1 | 8/2013 | McMahon et al. |
| 2013/0215226 A1 | 8/2013 | Chauvier et al. |
| 2013/0222656 A1 | 8/2013 | Kaneko |
| 2013/0234935 A1 | 9/2013 | Griffith |
| 2013/0242137 A1 | 9/2013 | Kirkland |
| 2013/0258451 A1* | 10/2013 | El-Ghoroury ........ G02B 26/101 359/298 |
| 2013/0262511 A1 | 10/2013 | Kuffner et al. |
| 2013/0286236 A1 | 10/2013 | Mankowski |
| 2013/0321574 A1 | 12/2013 | Zhang et al. |
| 2013/0321581 A1* | 12/2013 | El-Ghoroury .......... H04N 5/225 348/46 |
| 2013/0321677 A1 | 12/2013 | Cote et al. |
| 2013/0329107 A1 | 12/2013 | Burley et al. |
| 2013/0329132 A1* | 12/2013 | Tico ..................... H04N 5/14 348/571 |
| 2013/0335596 A1 | 12/2013 | Demandoix et al. |
| 2013/0342700 A1 | 12/2013 | Kass |
| 2014/0002502 A1 | 1/2014 | Han |
| 2014/0002699 A1 | 1/2014 | Guan |
| 2014/0003719 A1 | 1/2014 | Bai et al. |
| 2014/0013273 A1 | 1/2014 | Ng |
| 2014/0035959 A1 | 2/2014 | Lapstun |
| 2014/0037280 A1 | 2/2014 | Shirakawa |
| 2014/0049663 A1 | 2/2014 | Ng et al. |
| 2014/0059462 A1 | 2/2014 | Wernersson |
| 2014/0085282 A1 | 3/2014 | Luebke et al. |
| 2014/0092424 A1 | 4/2014 | Grosz |
| 2014/0098191 A1 | 4/2014 | Rime et al. |
| 2014/0132741 A1 | 5/2014 | Aagaard et al. |
| 2014/0133749 A1 | 5/2014 | Kuo et al. |
| 2014/0139538 A1 | 5/2014 | Barber et al. |
| 2014/0167196 A1 | 6/2014 | Heimgartner et al. |
| 2014/0176540 A1 | 6/2014 | Tosic et al. |
| 2014/0176592 A1 | 6/2014 | Wilburn et al. |
| 2014/0176710 A1 | 6/2014 | Brady |
| 2014/0177905 A1 | 6/2014 | Grefalda |
| 2014/0184885 A1 | 7/2014 | Tanaka et al. |
| 2014/0192208 A1 | 7/2014 | Okincha |
| 2014/0193047 A1 | 7/2014 | Grosz |
| 2014/0195921 A1 | 7/2014 | Grosz |
| 2014/0204111 A1 | 7/2014 | Vaidyanathan et al. |
| 2014/0211077 A1 | 7/2014 | Ng et al. |
| 2014/0218540 A1* | 8/2014 | Geiss ................... H04N 17/002 348/181 |
| 2014/0226038 A1 | 8/2014 | Kimura |
| 2014/0240463 A1 | 8/2014 | Pitts et al. |
| 2014/0240578 A1 | 8/2014 | Fishman et al. |
| 2014/0267243 A1 | 9/2014 | Venkataraman et al. |
| 2014/0267639 A1 | 9/2014 | Tatsuta |
| 2014/0300753 A1 | 10/2014 | Yin |
| 2014/0313350 A1* | 10/2014 | Keelan ................. H04N 9/045 348/188 |
| 2014/0313375 A1 | 10/2014 | Milnar |
| 2014/0340390 A1 | 11/2014 | Lanman et al. |
| 2014/0347540 A1 | 11/2014 | Kang |
| 2014/0354863 A1 | 12/2014 | Ahn et al. |
| 2014/0368494 A1 | 12/2014 | Sakharnykh et al. |
| 2014/0368640 A1 | 12/2014 | Strandemar et al. |
| 2015/0062178 A1 | 3/2015 | Matas et al. |

(56) References Cited

U.S. PATENT DOCUMENTS

| | | | |
|---|---|---|---|
| 2015/0062386 A1* | 3/2015 | Sugawara | G02B 7/34 348/241 |
| 2015/0092071 A1 | 4/2015 | Meng et al. | |
| 2015/0097985 A1 | 4/2015 | Akeley | |
| 2015/0193937 A1 | 7/2015 | Georgiev et al. | |
| 2015/0206340 A1 | 7/2015 | Munkberg et al. | |
| 2015/0207990 A1 | 7/2015 | Ford et al. | |
| 2015/0237273 A1* | 8/2015 | Sawadaishi | H04N 5/3572 348/234 |
| 2015/0104101 A1 | 10/2015 | Bryant et al. | |
| 2015/0310592 A1* | 10/2015 | Kano | H04N 1/58 382/167 |
| 2015/0312553 A1 | 10/2015 | Ng et al. | |
| 2015/0312593 A1 | 10/2015 | Akeley et al. | |
| 2015/0370011 A1 | 12/2015 | Ishihara | |
| 2015/0370012 A1 | 12/2015 | Ishihara | |
| 2016/0029017 A1 | 1/2016 | Liang | |
| 2016/0142615 A1 | 5/2016 | Liang | |
| 2016/0155215 A1 | 6/2016 | Suzuki | |
| 2016/0165206 A1 | 6/2016 | Huang et al. | |
| 2016/0173844 A1 | 6/2016 | Knight et al. | |
| 2016/0191823 A1 | 6/2016 | El-Ghoroury | |
| 2016/0253837 A1 | 9/2016 | Zhu et al. | |
| 2016/0269620 A1 | 9/2016 | Romanenko et al. | |
| 2016/0307368 A1 | 10/2016 | Akeley | |
| 2016/0307372 A1 | 10/2016 | Pitts et al. | |
| 2016/0309065 A1 | 10/2016 | Karafin et al. | |
| 2016/0353026 A1 | 12/2016 | Blonde et al. | |
| 2016/0381348 A1 | 12/2016 | Hayasaka | |
| 2017/0059305 A1 | 3/2017 | Nonn et al. | |
| 2017/0067832 A1 | 3/2017 | Ferrara, Jr. et al. | |
| 2017/0094906 A1 | 3/2017 | Liang et al. | |
| 2017/0134639 A1 | 5/2017 | Pitts et al. | |
| 2017/0139131 A1 | 5/2017 | Karafin et al. | |
| 2017/0237971 A1 | 8/2017 | Pitts et al. | |
| 2017/0243373 A1 | 8/2017 | Bevensee et al. | |
| 2017/0244948 A1 | 8/2017 | Pang et al. | |
| 2017/0256036 A1 | 9/2017 | Song et al. | |
| 2017/0263012 A1 | 9/2017 | Sabater et al. | |
| 2017/0302903 A1 | 10/2017 | Ng et al. | |
| 2017/0358092 A1 | 12/2017 | Bleibel et al. | |
| 2017/0365068 A1 | 12/2017 | Tan et al. | |
| 2018/0012397 A1 | 1/2018 | Carothers | |
| 2018/0020204 A1 | 1/2018 | Pang et al. | |
| 2018/0033209 A1 | 2/2018 | Akeley et al. | |
| 2018/0034134 A1 | 2/2018 | Pang et al. | |
| 2018/0070066 A1 | 3/2018 | Knight et al. | |
| 2018/0070067 A1 | 3/2018 | Knight et al. | |
| 2018/0082405 A1 | 3/2018 | Liang | |
| 2018/0089903 A1 | 3/2018 | Pang et al. | |
| 2018/0097867 A1 | 4/2018 | Pang et al. | |
| 2018/0158198 A1 | 6/2018 | Kamad | |

FOREIGN PATENT DOCUMENTS

| | | |
|---|---|---|
| DE | 19624421 | 1/1997 |
| JP | 2010020100 | 1/2010 |
| JP | 2011135170 | 7/2011 |
| WO | 2003052465 | 6/2003 |
| WO | 2006039486 | 4/2006 |
| WO | 2007092545 | 8/2007 |
| WO | 2007092581 | 8/2007 |
| WO | 2011010234 | 3/2011 |
| WO | 2011029209 | 3/2011 |
| WO | 2011081187 | 7/2011 |

OTHER PUBLICATIONS

U.S. Appl. No. 15/590,808, filed May 9, 2017 listing Alex Song et al. as inventors, entitled "Adaptive Control for Immersive Experience Delivery".

U.S. Appl. No. 15/864,938, filed Jan. 8, 2018 listing Jon Karafin et al. as inventors, entitled "Motion Blur for Light-Field Images".

U.S. Appl. No. 15/703,553, filed Sep. 13, 2017 listing Jon Karafin et al. as inventors, entitled "4D Camera Tracking and Optical Stabilization".

U.S. Appl. No. 15/590,841, filed May 9, 2017 listing Kurt Akeley et al. as inventors, entitled "Vantage Generation and Interactive Playback".

U.S. Appl. No. 15/590,951, filed May 9, 2017 listing Alex Song et al. as inventors, entitled "Wedge-Based Light-Field Video Capture".

U.S. Appl. No. 15/944,551, filed Apr. 3, 2018 listing Zejing Wang et al. as inventors, entitled "Generating Dolly Zoom Effect Using Light Field Image Data".

U.S. Appl. No. 15/874,723, filed Jan. 18, 2018 listing Mark Weir et al. as inventors, entitled "Multi-Camera Navigation Interface".

U.S. Appl. No. 15/897,994, filed Feb. 15, 2018 listing Trevor Carothers et al. as inventors, entitled "Generation of Virtual Reality With 6 Degrees of Freesom From Limited Viewer Data".

U.S. Appl. No. 15/605,037, filed May 25, 2017 listing Zejing Wang et al. as inventors, entitled "Multi-View Back-Projection to a Light-Field".

U.S. Appl. No. 15/897,836, filed Feb. 15, 2018 listing Francois Bleibel et al. as inventors, entitled "Multi-View Contour Tracking".

U.S. Appl. No. 15/897,942, filed Feb. 15, 2018 listing Francois Bleibel et al. as inventors, entitled "Multi-View Contour Tracking With Grabcut".

Adelsberger, R. et al., "Spatially Adaptive Photographic Flash," ETH Zurich, Department of Computer Science, Technical Report 612, 2008, pp. 1-12.

Adelson et al., "Single Lens Stereo with a Plenoptic Camera" IEEE Translation on Pattern Analysis and Machine Intelligence, Feb. 1992. vol. 14, No. 2, pp. 99-106.

Adelson, E. H., and Bergen, J. R. 1991. The plenoptic function and the elements of early vision. In Computational Models of Visual Processing, edited by Michael S. Landy and J. Anthony Movshon. Cambridge, Mass.: mit Press.

Adobe Systems Inc, "XMP Specification", Sep. 2005.

Adobe, "Photoshop CS6 / in depth: Digital Negative (DNG)", http://www.adobe.com/products/photoshop/extend. displayTab2html. Retrieved Jan. 2013.

Agarwala, A., et al., "Interactive Digital Photomontage," ACM Transactions on Graphics, Proceedings of SIGGRAPH 2004, vol. 32, No. 3, 2004.

Andreas Observatory, Spectrograph Manual: IV. Flat-Field Correction, Jul. 2006.

Apple, "Apple iPad: Photo Features on the iPad", Retrieved Jan. 2013.

Bae, S., et al., "Defocus Magnification", Computer Graphics Forum, vol. 26, Issue 3 (Proc. Of Eurographics 2007), pp. 1-9.

Belhumeur, Peter et al., "The Bas-Relief Ambiguity", International Journal of Computer Vision, 1997, pp. 1060-1066.

Belhumeur, Peter, et al., "The Bas-Relief Ambiguity", International Journal of Computer Vision, 1999, pp. 33-44, revised version.

Bhat, P. et al. "GradientShop: A Gradient-Domain Optimization Framework for Image and Video Filtering," SIGGRAPH 2010; 14 pages.

Bolles, R., et al., "Epipolar-Plane Image Analysis: An Approach to Determining Structure from Motion", International Journal of Computer Vision, 1, 7-55 (1987).

Bourke, Paul, "Image filtering in the Frequency Domain," pp. 1-9, Jun. 1998.

Canon, Canon Speedlite wireless flash system, User manual for Model 550EX, Sep. 1998.

Chai, Jin-Xang et al., "Plenoptic Sampling", ACM SIGGRAPH 2000, Annual Conference Series, 2000, pp. 307-318.

Chen, S. et al., "A CMOS Image Sensor with On-Chip Image Compression Based on Predictive Boundary Adaptation and Memoryless QTD Algorithm," Very Large Scalee Integration (VLSI) Systems, IEEE Transactions, vol. 19, Issue 4; Apr. 2011.

Chen, W., et al., "Light Field mapping: Efficient representation and hardware rendering of surface light fields", ACM Transactions on Graphics 21, 3, 447-456, 2002.

Cohen, Noy et al., "Enhancing the performance of the light field microscope using wavefront coding," Optics Express, vol. 22, issue 20; 2014.

(56) References Cited

OTHER PUBLICATIONS

Daly, D., "Microlens Arrays" Retrieved Jan. 2013.
Debevec, et al, "A Lighting Reproduction Approach to Live-Action Compoisting" Proceedings SIGRAPH 2002.
Debevec, P., et al., "Acquiring the reflectance field of a human face", SIGGRAPH 2000.
Debevec, P., et al., "Recovering high dynamic radiance maps from photographs", SIGGRAPH 1997, 369-378.
Design of the xBox menu. Retrieved Jan. 2013.
Digital Photography Review, "Sony Announce new RGBE CCD," Jul. 2003.
Dorsey, J., et al., "Design and simulation of opera light and projection effects", in Computer Graphics (Proceedings of SIG-GRAPH 91), vol. 25, 41-50.
Dorsey, J., et al., "Interactive design of complex time dependent lighting", IEEE Computer Graphics and Applications 15, 2 (Mar. 1995), 26-36.
Dowski et al., "Wavefront coding: a modern method of achieving high performance and/or low cost imaging systems" SPIE Proceedings, vol. 3779, Jul. 1999, pp. 137-145.
Dowski, Jr. "Extended Depth of Field Through Wave-Front Coding," Applied Optics, vol. 34, No. 11, Apr. 10, 1995; pp. 1859-1866.
Duparre, J. et al., "Micro-Optical Artificial Compound Eyes," Institute of Physics Publishing, Apr. 2006.
Eisemann, Elmar, et al., "Flash Photography Enhancement via Intrinsic Relighting", SIGGRAPH 2004.
Fattal, Raanan, et al., "Multiscale Shape and Detail Enhancement from Multi-light Image Collections", SIGGRAPH 2007.
Fernando, Randima, "Depth of Field—A Survey of Techniques," GPU Gems. Boston, MA; Addison-Wesley, 2004.
Fitzpatrick, Brad, "Camlistore", Feb. 1, 2011.
Fujifilm, Super CCD EXR Sensor by Fujifilm, brochure reference No. EB-807E, 2008.
Georgiev, T. et al., "Reducing Plenoptic Camera Artifacts," Computer Graphics Forum, vol. 29, No. 6, pp. 1955-1968; 2010.
Georgiev, T., et al., "Spatio-Angular Resolution Tradeoff in Integral Photography," Proceedings of Eurographics Symposium on Rendering, 2006.
Georgiev, T., et al., "Suppersolution with Plenoptic 2.0 Cameras," Optical Society of America 2009; pp. 1-3.
Georgiev, T., et al., "Unified Frequency Domain Analysis of Lightfield Cameras" (2008).
Georgiev, T., et al., Plenoptic Camera 2.0 (2008).
Girod, B., "Mobile Visual Search", IEEE Signal Processing Magazine, Jul. 2011.
Gortler et al., "The lumigraph" SIGGRAPH 96, pp. 43-54.
Groen et al., "A Comparison of Different Focus Functions for Use in Autofocus Algorithms," Cytometry 6:81-91, 1985.
Haeberli, Paul "A Multifocus Method for Controlling Depth of Field" Graphica Obscura, 1994, pp. 1-3.
Heide, F. et al., "High-Quality Computational Imaging Through Simple Lenses," ACM Transactions on Graphics, SIGGRAPH 2013; pp. 1-7.
Heidelberg Collaboratory for Image Processing, "Consistent Depth Estimation in a 4D Light Field," May 2013.
Hirigoyen, F., et al., "1.1 um Backside Imager vs. Frontside Image: an optics-dedicated FDTD approach", IEEE 2009 International Image Sensor Workshop.
Huang, Fu-Chung et al., "Eyeglasses-free Display: Towards Correcting Visual Aberrations with Computational Light Field Displays," ACM Transaction on Graphics, Aug. 2014, pp. 1-12.
Isaksen, A., et al., "Dynamically Reparameterized Light Fields," SIGGRAPH 2000, pp. 297-306.
Ives H., "Optical properties of a Lippman lenticulated sheet," J. Opt. Soc. Am. 21, 171 (1931).
Ives, H. "Parallax Panoramagrams Made with a Large Diameter Lens", Journal of the Optical Society of America; 1930.
Jackson et al., "Selection of a Convolution Function for Fourier Inversion Using Gridding" IEEE Transactions on Medical Imaging, Sep. 1991, vol. 10, No. 3, pp. 473-478.

Kautz, J., et al., "Fast arbitrary BRDF shading for low-frequency lighting using spherical harmonics", in Eurographic Rendering Workshop 2002, 291-296.
Koltun, et al., "Virtual Occluders: An Efficient Interediate PVS Representation", Rendering Techniques 2000: Proc. 11th Eurographics Workshop Rendering, pp. 59-70, Jun. 2000.
Kopf, J., et al., Deep Photo: Model-Based Photograph Enhancement and Viewing, SIGGRAPH Asia 2008.
Lehtinen, J., et al. "Matrix radiance transfer", in Symposium on Interactive 3D Graphics, 59-64, 2003.
Lesser, Michael, "Back-Side Illumination", 2009.
Levin, A., et al., "Image and Depth from a Conventional Camera with a Coded Aperture", SIGGRAPH 2007, pp. 1-9.
Levoy et al.,"Light Field Rendering" SIGGRAPH 96 Proceeding, 1996. pp. 31-42.
Levoy, "Light Fields and Computational Imaging" IEEE Computer Society, Aug. 2006, pp. 46-55.
Levoy, M. "Light Field Photography and Videography," Oct. 18, 2005.
Levoy, M. "Stanford Light Field Microscope Project," 2008; http://graphics.stanford.edu/projects/Ifmicroscope/, 4 pages.
Levoy, M., "Autofocus: Contrast Detection", http://graphics.stanford.edu/courses/cs178/applets/autofocusPD.html, pp. 1-3, 2010.
Levoy, M., "Autofocus: Phase Detection", http://graphics.stanford.edu/courses/cs178/applets/autofocusPD.html, pp. 1-3, 2010.
Levoy, M., et al., "Light Field Microscopy," ACM Transactions on Graphics, vol. 25, No. 3, Proceedings SIGGRAPH 2006.
Liang, Chia-Kai, et al., "Programmable Aperture Photography: Multiplexed Light Field Acquisition", ACM SIGGRAPH, 2008.
Lippmann, "Reversible Prints", Communication at the French Society of Physics, Journal of Physics, 7 , 4, Mar. 1908, pp. 821-825.
Lumsdaine et al., "Full Resolution Lighttield Rendering" Adobe Technical Report Jan. 2008, pp. 1-12.
Maeda, Y. et al., "A CMOS Image Sensor with Pseudorandom Pixel Placement for Clear Imaging," 2009 International Symposium on Intelligent Signal Processing and Communication Systems, Dec. 2009.
Magnor, M. et al., "Model-Aided Coding of Multi-Viewpoint Image Data," Proceedings IEEE Conference on Image Processing, ICIP-2000, Vancouver, Canada, Sep. 2000. https://graphics.tu-bs.de/static/people/magnor/publications/icip00.pdf.
Mallat, Stephane, "A Wavelet Tour of Signal Processing", Academic Press 1998.
Malzbender, et al., "Polynomial Texture Maps", Proceedings SIG-GRAPH 2001.
Marshall, Richard J. et al., "Improving Depth Estimation from a Plenoptic Camera by Patterned Illumination," Proc. of SPIE, vol. 9528, 2015, pp. 1-6.
Masselus, Vincent, et al., "Relighting with 4D Incident Light Fields", SIGGRAPH 2003.
Meynants, G., et al., "Pixel Binning in CMOS Image Sensors," Frontiers in Electronic Imaging Conference, 2009.
Moreno-Noguer, F. et al., "Active Refocusing of Images and Videos," ACM Transactions on Graphics, Aug. 2007: pp. 1-9.
Munkberg, J. et al., "Layered Reconstruction for Defocus and Motion Blur" EGSR 2014, pp. 1-12.
Naemura et al., "3-D Computer Graphics based on Integral Photography" Optics Express, Feb. 12, 2001 vol. 8, No. 2, pp. 255-262.
Nakamura, J., "Image Sensors and Signal Processing for Digital Still Cameras" (Optical Science and Engineering), 2005.
National Instruments, "Anatomy of a Camera," pp. 1-5, Sep. 6, 2006.
Nayar, Shree, et al., "Shape from Focus", IEEE Transactions on Pattern Analysis and Machine Intelligence, vol. 16, No. 8, pp. 824-831, Aug. 1994.
Ng, R., et al. "Light Field Photography with a Hand-held Plenoptic Camera," Stanford Technical Report, CSTR 2005-2, 2005.
Ng, R., et al., "All-Frequency Shadows Using Non-linear Wavelet Lighting Approximation. ACM Transactions on Graphics," ACM Transactions on Graphics; Proceedings of SIGGRAPH 2003.
Ng, R., et al., "Triple Product Wavelet Integrals for All-Frequency Relighting", ACM Transactions on Graphics Proceedings of SIG-GRAPH 2004).

(56) References Cited

OTHER PUBLICATIONS

Ng, Yi-Ren, "Digital Light Field Photography," Doctoral Thesis, Standford University, Jun. 2006; 203 pages.
Ng., R., "Fourier Slice Photography," ACM Transactions on Graphics, Proceedings of SIGGRAPH 2005, vol. 24, No. 3, 2005, pp. 735-744.
Nguyen, Hubert. "Practical Post-Process Depth of Field." GPU Gems 3. Upper Saddle River, NJ: Addison-Wesley, 2008.
Nimeroff, J., et al., "Efficient rendering of naturally illuminatied environments" in Fifth Eurographics Workshop on Rendering, 359-373, 1994.
Wikipedia—Expeed: http://en.wikipedia.org/wiki/EXPEED. Retrieved Jan. 15, 2014.
Wikipedia—Extensible Metadata Platform: http://en.wikipedia.org/wiki/Extensible_Metadata_Platform. Retrieved Jan. 2013.
Wikipedia—Key framing for video animation: http://en.wikipedia.org/wiki/Key_frame. Retrieved Jan. 2013.
Wikipedia—Lazy loading of image data: http://en.wikipedia.org/wiki/Lazy_loading. Retrieved Jan. 2013.
Wikipedia—Methods of Variable Bitrate Encoding: http://en.wikipedia.org/wiki/Variable_bitrate#Methods_of_VBR_encoding. Retrieved Jan. 2013.
Wikipedia—Portable Network Graphics format: http://en.wikipedia.org/wiki/Portable_Network_Graphics. Retrieved Jan. 2013.
Wikipedia—Unsharp Mask Technique: https://en.wikipedia.org/wiki/Unsharp_masking. Retrieved May 3, 2016.
Wilburn et al., "High Performance Imaging using Large Camera Arrays", ACM Transactions on Graphics (TOG), vol. 24, Issue 3 (Jul. 2005), Proceedings of ACM SIGGRAPH 2005, pp. 765-776.
Wilburn, Bennett, et al., "High Speed Video Using A Dense Camera Array", 2004.
Wilburn, Bennett, et al., "The Light Field Video Camera", Proceedings of Media Processors 2002.
Williams, L. "Pyramidal Parametrics," Computer Graphic (1983).
Winnemoller, H., et al., "Light Waving: Estimating Light Positions From Photographs Alone", Eurographics 2005.
Wippermann, F. "Chirped Refractive Microlens Array," Dissertation 2007.
Wuu, S., et al., "A Manufacturable Back-Side Illumination Technology Using Bulk Si Substrate for Advanced CMOS Image Sensors", 2009 International Image Sensor Workshop, Bergen, Norway.
Wuu, S., et al., "BSI Technology with Bulk Si Wafer", 2009 International Image Sensor Workshop, Bergen, Norway.
Xiao, Z. et al., "Aliasing Detection and Reduction in Plenoptic Imaging," IEEE Conference on Computer Vision and Pattern Recognition; 2014.
Xu, Xin et al., "Robust Automatic Focus Algorithm for Low Contrast Images Using a New Contrast Measure," Sensors 2011; 14 pages.
Zheng, C. et al., "Parallax Photography: Creating 3D Cinematic Effects from Stills", Proceedings of Graphic Interface, 2009.
Zitnick, L. et al., "High-Quality Video View Interpolation Using a Layered Representation," Aug. 2004; ACM Transactions on Graphics (TOG), Proceedings of ACM SIGGRAPH 2004; vol. 23, Issue 3; pp. 600-608.
Zoberbier, M., et al., "Wafer Cameras—Novel Fabrication and Packaging Technologies", 2009 International Image Senor Workshop, Bergen, Norway, 5 pages.
Nokia, "City Lens", May 2012.
Ogden, J., "Pyramid-Based Computer Graphics", 1985.
Okano et al., "Three-dimensional video system based on integral photograohy" Optical Engineering, Jun. 1999. vol. 38, No. 6, pp. 1072-1077.
Orzan, Alexandrina, et al., "Diffusion Curves: A Vector Representation for Smooth-Shaded Images," ACM Transactions on Graphics—Proceedings of SIGGRAPH 2008; vol. 27; 2008.
Pain, B., "Back-Side Illumination Technology for SOI-CMOS Image Sensors", 2009.

Perez, Patrick et al., "Poisson Image Editing," ACM Transactions on Graphics—Proceedings of ACM SIGGRAPH 2003; vol. 22, Issue 3; Jul. 2003; pp. 313-318.
Petschnigg, George, et al., "Digial Photography with Flash and No-Flash Image Pairs", SIGGRAPH 2004.
Primesense, "The Primesense 3D Awareness Sensor", 2007.
Ramamoorthi, R., et al, "Frequency space environment map rendering" ACM Transactions on Graphics (SIGGRAPH 2002 proceedings) 21, 3, 517-526.
Ramamoorthi, R., et al., "An efficient representation for irradiance environment maps", in Proceedings of SIGGRAPH 2001, 497-500.
Raskar, Ramesh et al., "Glare Aware Photography: 4D Ray Sampling for Reducing Glare Effects of Camera Lenses," ACM Transactions on Graphics—Proceedings of ACM SIGGRAPH, Aug. 2008; vol. 27, Issue 3; pp. 1-10.
Raskar, Ramesh et al., "Non-photorealistic Camera: Depth Edge Detection and Stylized Rendering using Multi-Flash Imaging", SIGGRAPH 2004.
Raytrix, "Raytrix Lightheld Camera," Raytrix GmbH, Germany 2012, pp. 1-35.
Roper Scientific, Germany "Fiber Optics," 2012.
Scharstein, Daniel, et al., "High-Accuracy Stereo Depth Maps Using Structured Light," CVPR'03 Proceedings of the 2003 IEEE Computer Society, pp. 195-202.
Schirmacher, H. et al., "High-Quality Interactive Lumigraph Rendering Through Warping," May 2000, Graphics Interface 2000.
Shade, Jonathan, et al., "Layered Depth Images", SIGGRAPH 98, pp. 1-2.
Shreiner, OpenGL Programming Guide, 7th edition, Chapter 8, 2010.
Simpleviewer, "Tiltview", http://simpleviewer.net/tiltviewer. Retrieved Jan. 2013.
Skodras, A. et al., "The JPEG 2000 Still Image Compression Standard," Sep. 2001, IEEE Signal Processing Magazine, pp. 36-58.
Sloan, P., et al., "Precomputed radiance transfer for real-time rendering in dynamic, low-frequency lighting environments", ACM Transactions on Graphics 21, 3, 527-536, 2002.
Snavely, Noah, et al., "Photo-tourism: Exploring Photo collections in 3D", ACM Transactions on Graphics (SIGGRAPH Proceedings), 2006.
Sokolov, "Autostereoscopy and Integral Photography by Professor Lippmann's Method" , 1911, pp. 23-29.
Sony Corp, "Interchangeable Lens Digital Camera Handbook", 2011.
Sony, Sony's First Curved Sensor Photo: http://www.engadget.com; Jul. 2014.
Stensvold, M., "Hybrid AF: A New Approach to Autofocus Is Emerging for both Still and Video", Digital Photo Magazine, Nov. 13, 2012.
Story, D., "The Future of Photography", Optics Electronics, Oct. 2008.
Sun, Jian, et al., "Stereo Matching Using Belief Propagation", 2002.
Tagging photos on Flickr, Facebook and other online photo sharing sites (see, for example, http://support.gnip.com/customer/portal/articles/809309-flickr-geo-photos-tag-search). Retrieved Jan. 2013.
Takahashi, Keita, et al., "All in-focus View Synthesis from Under-Sampled Light Fields", ICAT 2003, Tokyo, Japan.
Tanida et al., "Thin observation module by bound optics (TOMBO): concept and experimental verification" Applied Optics 40, 11 (Apr. 10, 2001), pp. 1806-1813.
Tao, Michael, et al., "Depth from Combining Defocus and Correspondence Using Light-Field Cameras", Dec. 2013.
Techcrunch, "Coolinis", Retrieved Jan. 2013.
Teo, P., et al., "Efficient linear rendering for interactive light design", Tech. Rep. STAN-CS-TN-97-60, 1998, Stanford Jniversity.
Teranishi, N. "Evolution of Optical Structure in Images Sensors," Electron Devices Meeting (IEDM) 2012 IEEE International; Dec. 10-13, 2012.
Vaish et al., "Using plane + parallax for calibrating dense camera arrays", In Proceedings CVPR 2004, pp. 2-9.

(56) References Cited

OTHER PUBLICATIONS

Vaish, V., et al., "Synthetic Aperture Focusing Using a Shear-Warp Factorization of the Viewing Transform," Workshop on Advanced 3D Imaging for Safety and Security (in conjunction with CVPR 2005), 2005.

VR Playhouse, "The Surrogate," http://www.vrplayhouse.com/the-surrogate.

Wanner, S. et al., "Globally Consistent Depth Labeling of 4D Light Fields," IEEE Conference on Computer Vision and Pattern Recognition, 2012.

Wanner, S. et al., "Variational Light Field Analysis for Disparity Estimation and Super-Resolution," IEEE Transacations on Pattern Analysis and Machine Intellegence, 2013.

Wenger, et al, "Performance Relighting and Reflectance Transformation with Time-Multiplexed Illumination", Institute for Creative Technologies, SIGGRAPH 2005.

Wetzstein, Gordon, et al., "Sensor Saturation in Fourier Multiplexed Imaging", IEEE Conference on Computer Vision and Pattern Recognition (2010).

Wikipedia—Adaptive Optics: http://en.wikipedia.org/wiki/adaptive_optics. Retrieved Feb. 2014.

Wikipedia—Autofocus systems and methods: http://en.wikipedia.org/wiki/Autofocus. Retrieved Jan. 2013.

Wikipedia—Bayer Filter: http:/en.wikipedia.org/wiki/Bayer_filter. Retrieved Jun. 20, 2013.

Wikipedia—Color Image Pipeline: http://en.wikipedia.org/wiki/color image_pipeline. Retrieved Jan. 15, 2014.

Wikipedia—Compression standard JPEG XR: http://en.wikipedia.org/wiki/JPEG_XR. Retrieved Jan. 2013.

Wikipedia—CYGM Filter http://en.wikipedia.org/wiki/CYGM_filter. Retrieved Jun. 20, 2013.

Wikipedia—Data overlay techniques for real-time visual feed. For example, heads-up displays: http://en.wikipedia.org/wiki/Head-up_display. Retrieved Jan. 2013.

Wikipedia—Exchangeable image file format: http://en.wikipedia.org/wiki/Exchangeable_image_file_format. Retrieved Jan. 2013.

\* cited by examiner

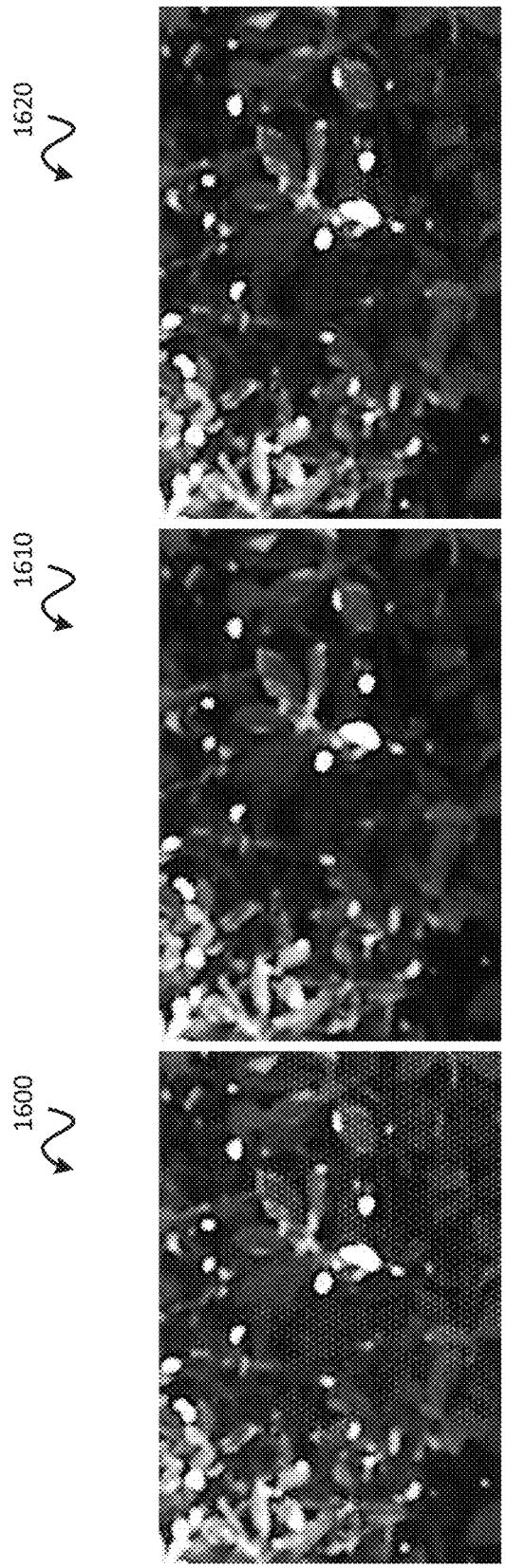

US 10,205,896 B2

AUTOMATIC LENS FLARE DETECTION AND CORRECTION FOR LIGHT-FIELD IMAGES

CROSS-REFERENCE TO RELATED APPLICATIONS

The present application is a divisional application of U.S. patent application Ser. No. 14/809,022, entitled "AUTOMATIC LENS FLARE DETECTION AND CORRECTION FOR LIGHT-FIELD IMAGES" and filed on Jul. 24, 2015, the entirety of which is incorporated by reference herein.

The present application is related to U.S. application Ser. No. 13/774,925 for "Compensating for Sensor Saturation and Microlens Modulation During Light-Field Image Processing", filed Feb. 22, 2013, issued on Feb. 3, 2015 as U.S. Pat. No. 8,948,545, the disclosure of which is incorporated herein by reference in its entirety.

The present application is related to U.S. Utility application Ser. No. 13/774,971 for "Compensating for Variation in Microlens Position During Light-Field Image Processing", filed on Feb. 22, 2013, issued on Sep. 9, 2014 as U.S. Pat. No. 8,831,377, the disclosure of which is incorporated herein by reference in its entirety.

The present application is related to U.S. Utility application Ser. No. 13/774,986 for "Light-Field Processing and Analysis, Camera Control, and User Interfaces and Interaction on Light-Field Capture Devices", filed on Feb. 22, 2013, issued on Mar. 31, 2015 as U.S. Pat. No. 8,995,785, the disclosure of which is incorporated herein by reference in its entirety.

The present application is related to U.S. Utility application Ser. No. 13/688,026 for "Extended Depth of Field and Variable Center of Perspective in Light-Field Processing", filed on Nov. 28, 2012, issued on Aug. 19, 2014 as U.S. Pat. No. 8,811,769, the disclosure of which is incorporated herein by reference in its entirety.

The present application is related to U.S. Utility application Ser. No. 11/948,901 for "Interactive Refocusing of Electronic Images,", filed Nov. 30, 2007, issued on Oct. 15, 2013 as U.S. Pat. No. 8,559,705, the disclosure of which is incorporated herein by reference in its entirety.

The present application is related to U.S. Utility application Ser. No. 12/703,367 for "Light-field Camera Image, File and Configuration Data, and Method of Using, Storing and Communicating Same,", filed Feb. 10, 2010, now abandoned, the disclosure of which is incorporated herein by reference in its entirety.

The present application is related to U.S. Utility application Ser. No. 13/027,946 for "3D Light-field Cameras, Images and Files, and Methods of Using, Operating, Processing and Viewing Same", filed on Feb. 15, 2011, issued on Jun. 10, 2014 as U.S. Pat. No. 8,749,620, the disclosure of which is incorporated herein by reference in its entirety.

The present application is related to U.S. Utility application Ser. No. 13/155,882 for "Storage and Transmission of Pictures Including Multiple Frames,", filed Jun. 8, 2011, issued on Dec. 9, 2014 as U.S. Pat. No. 8,908,058, the disclosure of which is incorporated herein by reference in its entirety.

TECHNICAL FIELD

The present disclosure relates to systems and methods for processing and displaying light-field image data, and more specifically, to systems and methods for removing and/or mitigating lens flare effects in light-field images.

BACKGROUND

Light-field images represent an advancement over traditional two-dimensional digital images because light-field images typically encode additional data for each pixel related to the trajectory of light rays incident to that pixel when the light field image was taken. This data can be used to manipulate the light-field image through the use of a wide variety of rendering techniques that are not possible to perform with a conventional photograph. In some implementations, a light-field image may be refocused and/or altered to simulate a change in the center of perspective (CoP) of the camera that received the image. Further, a light field image may be used to generate an enhanced depth-of-field (EDOF) image in which all parts of the image are in focus.

Unfortunately, light-field images are susceptible to some of the same image distortions found in conventional images, such as lens flare. "Lens flare" is the light scattered in a lens system through generally unwanted image formation mechanisms, such as internal reflection and scattering from material inside the lens system. In a conventional camera, lens flare usually leads to loss of contrast in the image. In light-field imaging, lens flare can produce artifacts in the light-field image that are particularly distracting because they show the microlens structure of the light-field image. Such artifacts may resemble many small bright spots rather than what viewers normally associate with lens flare. Portions of the image that should be solid in color may have bright flecks. Thus, it would be an advancement in the art to provide processing systems and methods capable of preventing, removing, and/or mitigating lens flare effects in light-field images.

SUMMARY

According to various embodiments, the system and method described herein process light-field image data so as to prevent, remove, and/or mitigate lens flare effects. These techniques may be used in the processing of light-field images such as a light-field image received from a light-field image capture device having a sensor and a plurality of microlenses.

The light-field image may be received in a data store. A processor may identify a plurality of flare-affected pixels affected by the lens flare. The flare-affected pixels may have flare-affected pixel values. The flare-affected pixels may be identified in various ways.

In some embodiments, the flare-affected pixels may be identified by, first, dividing the light-field image into a plurality of tiles, which may correspond to the microlenses of the light-field image capture device. Within each of the tiles, one or more maximum value pixels may be identified. Each of the maximum value pixels may have a pixel value higher than those of neighboring pixels. Thus, the maximum value pixels may be identified by comparing their pixel values with those of neighboring pixels. For each of the maximum value pixels, a flare model may be generated to indicate the location of the maximum value pixel within the tile.

The model may then be used for each maximum value pixel to compute the probability that the maximum value pixel is a flare-affected pixel. This may be done, for example, by comparing the location of the maximum value pixel with those of neighboring maximum value pixels. In this manner, it may be determined that at least some of the maximum value pixels are likely to be flare-affected pixels. The comparison with neighboring maximum value pixels may involve the use of a bilinear interpolation.

In other embodiments, the maximum value pixels may be identified as indicated above. Then, the flare-affected pixels may be identified by generating a global parametric flare model of the effects of the lens flare based on the locations of the maximum value pixels. The global parametric flare model may be a simple affine model that predicts the u and v coordinates of each maximum value pixel based on its location in the x and y directions. The affine model may be fitted to the light-field image by ascertaining the applicable constants that enable the affine model to most closely fit the locations of the maximum value pixels.

Once the flare-affected pixels have been identified, flare-corrected pixels may be generated for the flare-affected pixels. Relative to the flare-affected pixel values, the flare-corrected pixel values may at least partially remove (or in other words, mitigate) the effects of the lens flare. This may also be accomplished in various ways.

In some embodiments, the flare-corrected pixel values may be generated by, for each of the identified flare-affected pixels, using neighboring pixels to interpolate the flare-corrected pixel value. If the flare-affected pixel is located on an edge depicted in the light-field image, interpolation may be carried out by identifying edge-located neighboring pixels that are also located on the edge. Interpolation may be carried out exclusively using the edge-located neighboring pixels to preserve the integrity of the edge.

In other embodiments, the flare-corrected pixel values may be generated via application of a probability that each maximum value pixel is actually a flare-affected pixel. This probability may be computed as set forth above. The probability may be used to assign a weight, inversely proportional to the probability, to each of the maximum value pixels. Then, the flare-corrected pixel values may be generated by processing the light-field image with at least one process in which each of the flare-affected pixels is excluded from processing in proportion to the weight assigned to it.

Once the flare-corrected pixel values have been obtained, they may be used to generate a corrected light-field image in which the lens flare has been at least partially removed. In some embodiments, this may be done by, again, using the probability, for each of the maximum value pixels, that the maximum value pixel has been affected by lens flare. For each of the flare-affected pixels, the flare-affected pixel value may be blended with the flare-corrected pixel value, with the flare-corrected pixel value weighted in proportion to the probability. Thus, the pixel values pixels that have a higher probability of being flare-affected pixels may undergo a larger amount of correction. The corrected light-field image may be displayed, for example, on a display screen.

In some embodiments, the steps of identifying the maximum value pixels, generating the flare-corrected values, and/or generating a flare-corrected light-field image may be carried out recursively. Thus, the quality of correction of a lens flare may be enhanced and/or multiple lens flares may be corrected.

Further, in some embodiments, the user may designate one or more parameters applicable to identifying the maximum value pixels, generating the flare-corrected values, and/or generating a flare-corrected light-field image. The user may, for example, designate a subset of the light-field image to be corrected for lens flare as set forth above, or determine a degree of correction to be applied to the corrected light-field image.

BRIEF DESCRIPTION OF THE DRAWINGS

The accompanying drawings illustrate several embodiments. Together with the description, they serve to explain the principles of the embodiments. One skilled in the art will recognize that the particular embodiments illustrated in the drawings are merely exemplary, and are not intended to limit scope.

FIG. 11A is a light-field image before processing to correct for lens flare.

FIG. 11B is a corrected light-field image generated by application of the first identification method and the first correction method to the light-field image of FIG. 11A.

FIG. 11C is a corrected light-field image generated by application of the second identification method and the second correction method to the light-field image of FIG. 11A.

DEFINITIONS

Figure 1:
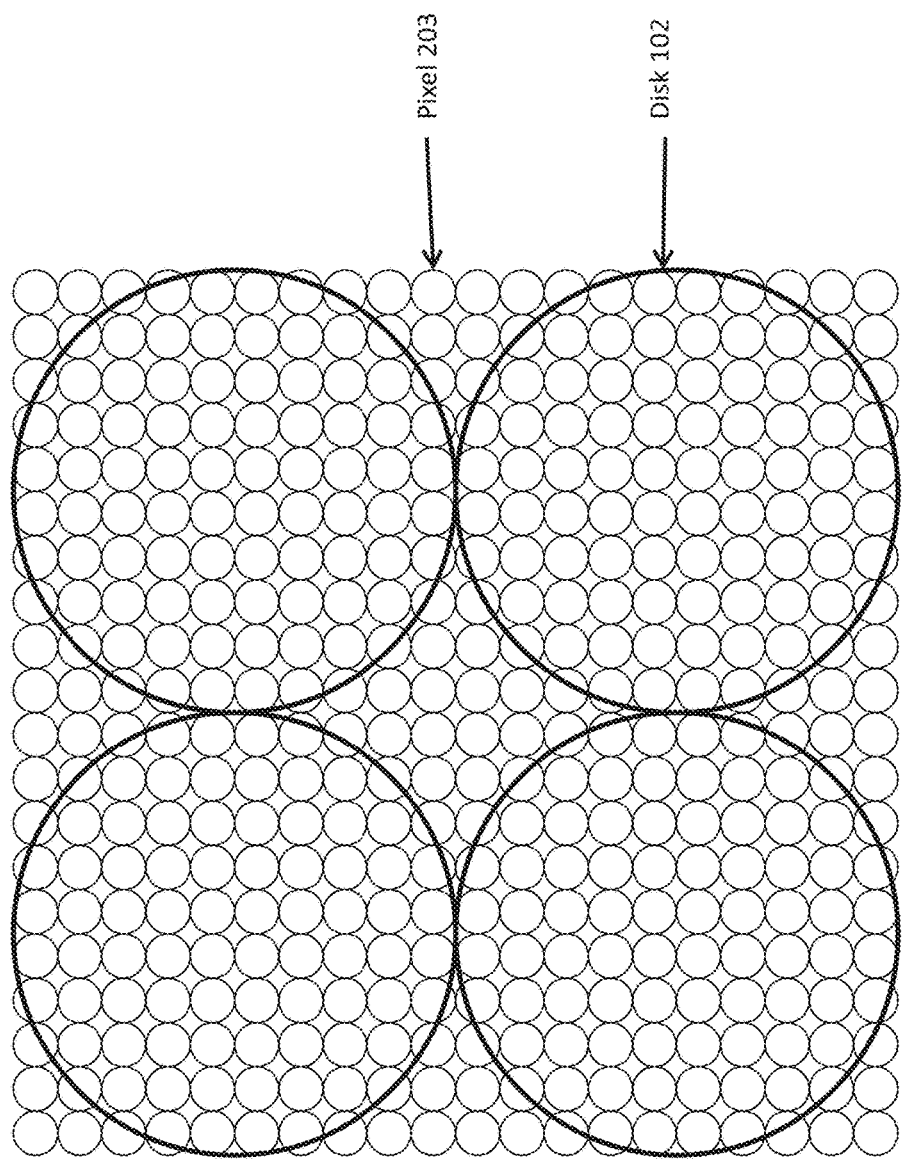
FIG. 1 depicts a portion of a light-field image.

For purposes of the description provided herein, the following definitions are used:

Corrected light-field image: the resulting image after a light-field image has been processed to correct an image distortion such as lens flare.

Depth: a representation of displacement between an object and/or corresponding image sample and a microlens array of a camera.

Disk: a region in a light-field image that is illuminated by light passing through a single microlens; may be circular or any other suitable shape.

Extended depth of field (EDOF) image: an image that has been processed to have objects in focus along a greater depth range.

Flare-affected pixels: pixels of an image with values that are believed to have been affected by lens flare.

flare-affected pixel values: the pixel values of flare-affected pixels

Flare-corrected pixel values: the pixel values of flare-affected pixels after correction has been applied.

Flare model: a formula, equation, or other analytical framework that can be used to describe effects of a lens flare on an image.

Image: a two-dimensional array of pixel values, or pixels, each specifying a color.

Image processing algorithm: any computer-implemented procedure for modifying an image.

Intermediate light-field image: a processed light-field image that is to undergo further processing.

Lens flare: light scattered within a lens system through generally unwanted image formation mechanisms.

Light-field image: an image that contains a representation of light field data captured at the sensor.

Maximum value pixels: pixels of an image that have a high pixel value relative to surrounding pixels.

Microlens: a small lens, typically one in an array of similar microlenses.

Pixel value: a number indicative of hue, luminance, intensity, and/or saturation of a pixel.

Processed light-field image: the resulting image after one or more processing steps are applied to a light-field image.

Sample: one or more pixels of an image.

Tiles: subsets of an image that are arranged in a two-dimensional pattern.

In addition, for ease of nomenclature, the term "camera" is used herein to refer to an image capture device or other data acquisition device. Such a data acquisition device can be any device or system for acquiring, recording, measuring, estimating, determining and/or computing data representative of a scene, including but not limited to two-dimensional image data, three-dimensional image data, and/or light-field data. Such a data acquisition device may include optics, sensors, and image processing electronics for acquiring data representative of a scene, using techniques that are well known in the art. One skilled in the art will recognize that many types of data acquisition devices can be used in connection with the present disclosure, and that the disclosure is not limited to cameras. Thus, the use of the term "camera" herein is intended to be illustrative and exemplary, but should not be considered to limit the scope of the disclosure. Specifically, any use of such term herein should be considered to refer to any suitable device for acquiring image data.

In the following description, several techniques and methods for processing light-field images are described. One skilled in the art will recognize that these various techniques and methods can be performed singly and/or in any suitable combination with one another.

Architecture

Figure 2:
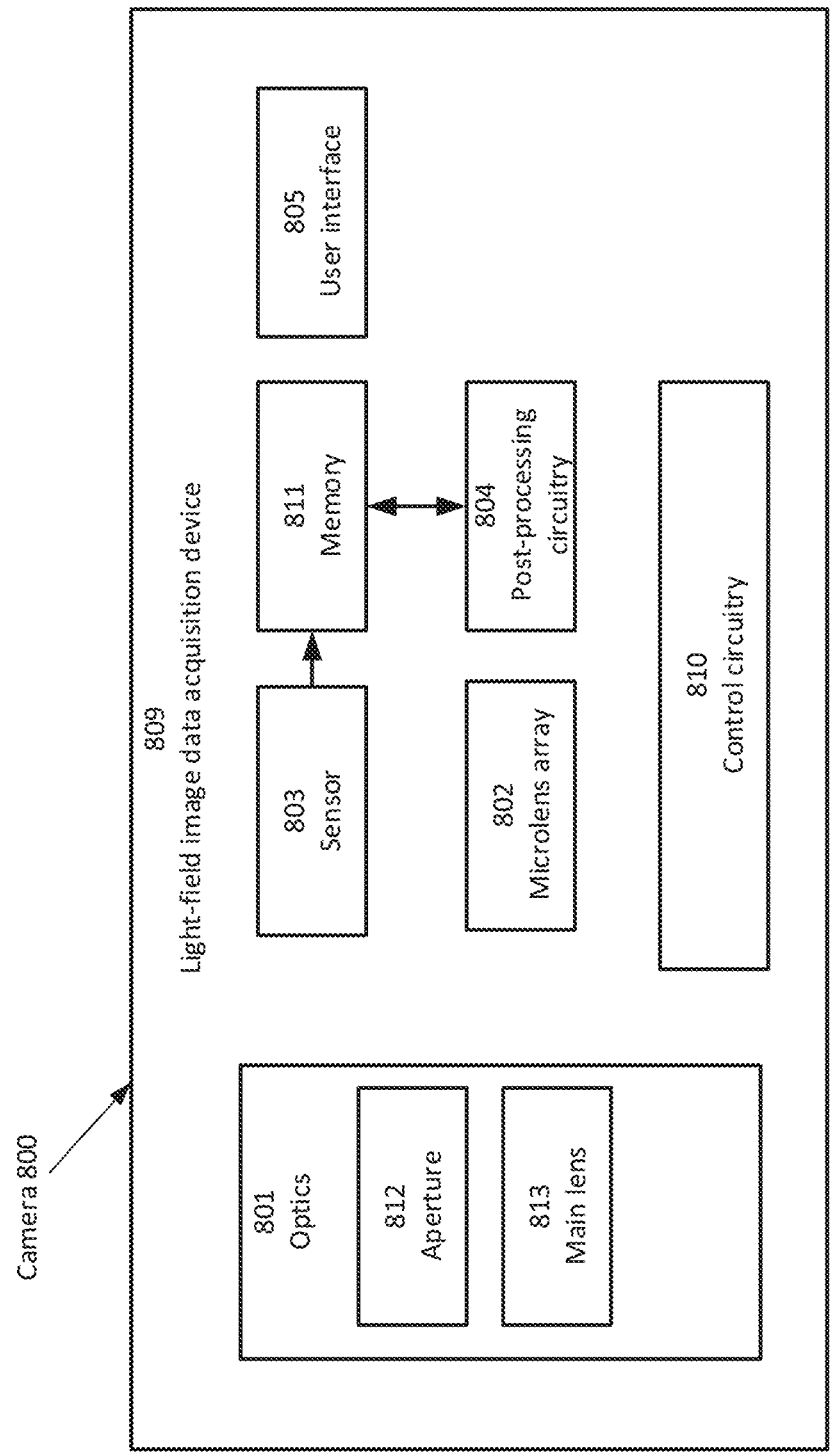
FIG. 2 depicts an example of an architecture for implementing the methods of the present disclosure in a light-field capture device, according to one embodiment.
Figure 3:
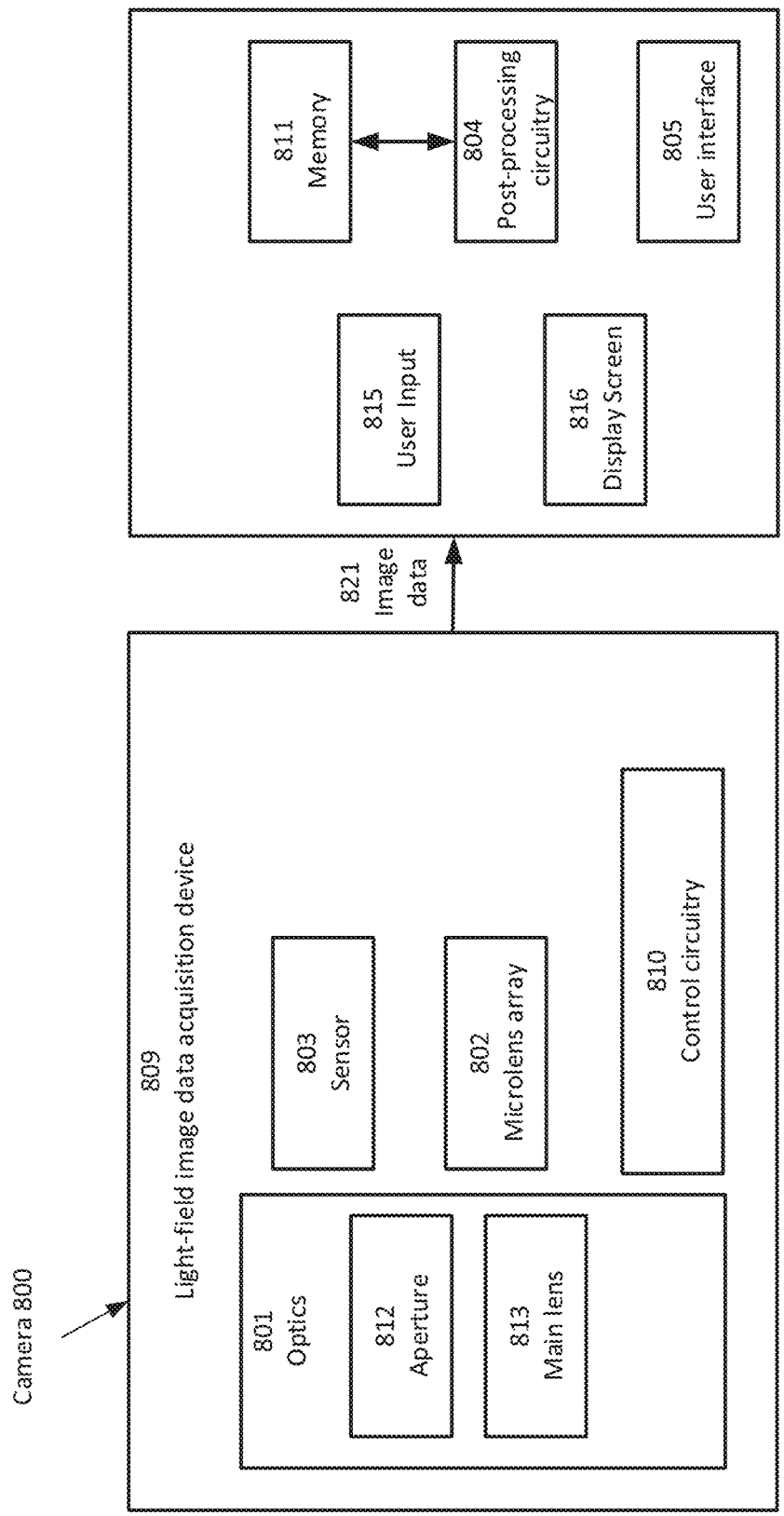
FIG. 3 depicts an example of an architecture for implementing the methods of the present disclosure in a post-processing system communicatively coupled to a light-field capture device, according to one embodiment.

In at least one embodiment, the system and method described herein can be implemented in connection with light-field images captured by light-field capture devices including but not limited to those described in Ng et al., Light-field photography with a hand-held plenoptic capture device, Technical Report CSTR 2005 February, Stanford Computer Science. Referring now to FIG. 2, there is shown a block diagram depicting an architecture for implementing the method of the present disclosure in a light-field capture device such as a camera 800. Referring now also to FIG. 3, there is shown a block diagram depicting an architecture for implementing the method of the present disclosure in a post-processing system communicatively coupled to a light-field capture device such as a camera 800, according to one embodiment. One skilled in the art will recognize that the particular configurations shown in FIGS. 2 and 3 are merely exemplary, and that other architectures are possible for camera 800. One skilled in the art will further recognize that several of the components shown in the configurations of FIGS. 2 and 3 are optional, and may be omitted or reconfigured.

Figure 4:
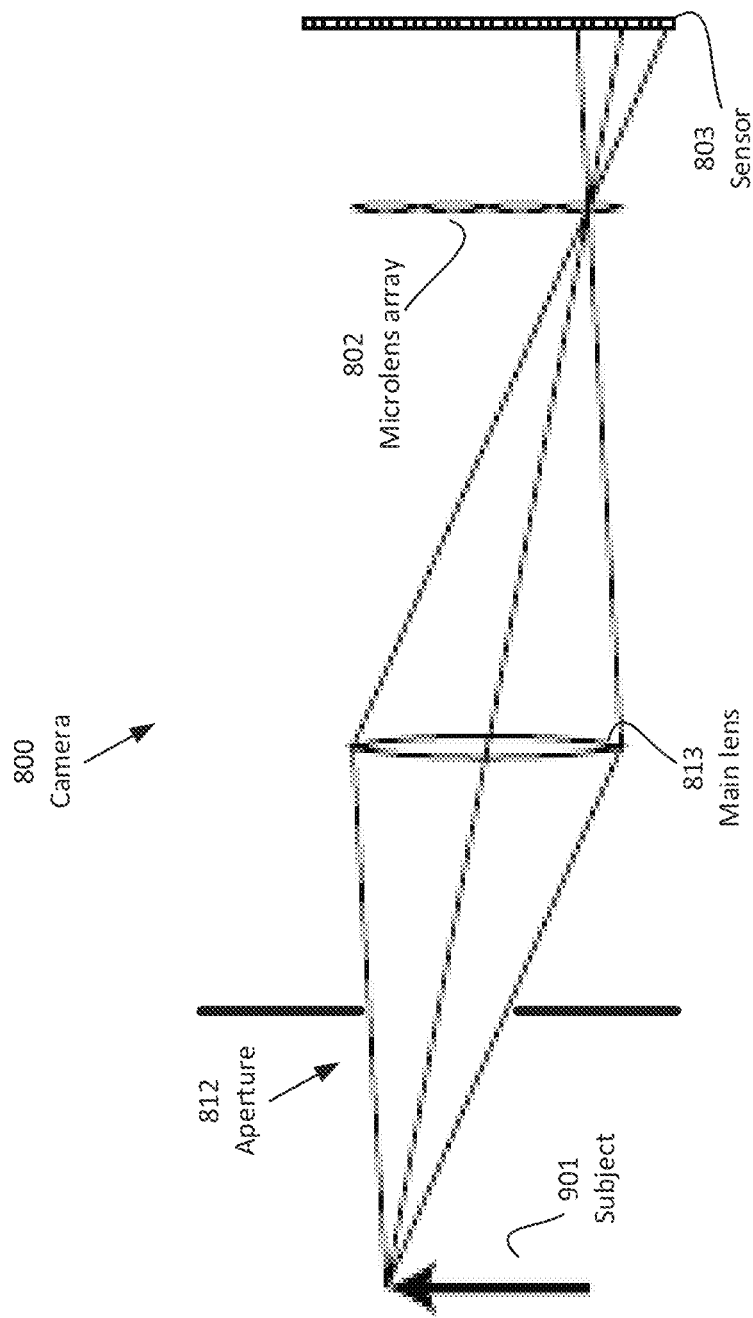
FIG. 4 depicts an example of an architecture for a light-field camera for implementing the methods of the present disclosure according to one embodiment.

In at least one embodiment, camera 800 may be a light-field camera that includes light-field image data acquisition device 809 having optics 801, image sensor 803 (including a plurality of individual sensors for capturing pixels), and microlens array 802. Optics 801 may include, for example, aperture 812 for allowing a selectable amount of light into camera 800, and main lens 813 for focusing light toward microlens array 802. In at least one embodiment, microlens array 802 may be disposed and/or incorporated in the optical path of camera 800 (between main lens 813 and sensor 803) so as to facilitate acquisition, capture, sampling of, recording, and/or obtaining light-field image data via sensor 803. Referring now also to FIG. 4, there is shown an example of an architecture for a light-field camera 800 for implementing the method of the present disclosure according to one embodiment. The Figure is not shown to scale. FIG. 4 shows, in conceptual form, the relationship between aperture 812, main lens 813, microlens array 802, and sensor 803, as such components interact to capture light-field data for subject 901.

In at least one embodiment, light-field camera 800 may also include a user interface 805 for allowing a user to provide input for controlling the operation of camera 800 for capturing, acquiring, storing, and/or processing image data.

In at least one embodiment, light-field camera 800 may also include control circuitry 810 for facilitating acquisition, sampling, recording, and/or obtaining light-field image data. For example, control circuitry 810 may manage and/or control (automatically or in response to user input) the acquisition timing, rate of acquisition, sampling, capturing, recording, and/or obtaining of light-field image data.

In at least one embodiment, camera 800 may include memory 811 for storing image data, such as output by image sensor 803. Such memory 811 can include external and/or internal memory. In at least one embodiment, memory 811 can be provided at a separate device and/or location from camera 800.

For example, camera 800 may store raw light-field image data, as output by sensor 803, and/or a representation thereof, such as a compressed image data file. In addition, as described in related U.S. Utility application Ser. No. 12/703,367 for "Light-field Camera Image, File and Configuration Data, and Method of Using, Storing and Communicating Same,", filed Feb. 10, 2010, memory 811 can also store data representing the characteristics, parameters, and/or configurations (collectively "configuration data") of device 809.

In at least one embodiment, captured image data is provided to post-processing circuitry 804. Such circuitry 804 may be disposed in or integrated into light-field image data acquisition device 809, as shown in FIG. 2, or it may be in a separate component external to light-field image data acquisition device 809, as shown in FIG. 3. Such separate component may be local or remote with respect to light-field image data acquisition device 809. Any suitable wired or wireless protocol can be used for transmitting image data 821 to circuitry 804; for example camera 800 can transmit image data 821 and/or other data via the Internet, a cellular data network, a WiFi network, a Bluetooth communication protocol, and/or any other suitable means.

Such a separate component may include any of a wide variety of computing devices, including but not limited to computers, smartphones, tablets, cameras, and/or any other device that processes digital information. Such a separate component may include additional features such as a user input 815 and/or a display screen 816. If desired, light-field image data may be displayed for the user on the display screen 816.

Overview

Light-field images often include a plurality of projections (which may be circular or of other shapes) of aperture 812 of camera 800, each projection taken from a different vantage point on the camera's focal plane. The light-field image may be captured on sensor 803. The interposition of microlens array 802 between main lens 813 and sensor 803 causes images of aperture 812 to be formed on sensor 803, each microlens in array 802 projecting a small image of main-lens aperture 812 onto sensor 803. These aperture-shaped projections are referred to herein as disks, although they need not be circular in shape. The term "disk" is not intended to be limited to a circular region, but can refer to a region of any shape.

Light-field images include four dimensions of information describing light rays impinging on the focal plane of camera 800 (or other capture device). Two spatial dimensions (herein referred to as x and y) are represented by the disks themselves. For example, the spatial resolution of a light-field image with 120,000 disks, arranged in a Cartesian pattern 400 wide and 300 high, is 400×300. Two angular dimensions (herein referred to as u and v) are represented as the pixels within an individual disk. For example, the angular resolution of a light-field image with 100 pixels within each disk, arranged as a 10×10 Cartesian pattern, is 10×10. This light-field image has a 4D (x,y,u,v) resolution of (400,300,10,10). Referring now to FIG. 1, there is shown an example of a 2-disk by 2-disk portion of such a light-field image, including depictions of disks 102 and individual pixels 203; for illustrative purposes, each disk 102 is ten pixels 203 across.

In at least one embodiment, the 4D light-field representation may be reduced to a 2-D image through a process of projection and reconstruction. As described in more detail in related U.S. Utility application Ser. No. 13/774,971 for "Compensating for Variation in Microlens Position During Light-Field Image Processing,", filed Feb. 22, 2013, the disclosure of which is incorporated herein by reference in its entirety, a virtual surface of projection may be introduced, and the intersections of representative rays with the virtual surface can be computed. The color of each representative ray may be taken to be equal to the color of its corresponding pixel.

Any number of image processing techniques can be used to reduce color artifacts, reduce projection artifacts, increase dynamic range, and/or otherwise improve image quality. Examples of such techniques, including for example modulation, demodulation, and demosaicing, are described in related U.S. application Ser. No. 13/774,925 for "Compensating for Sensor Saturation and Microlens Modulation During Light-Field Image Processing", filed Feb. 22, 2013, the disclosure of which is incorporated herein by reference.

In particular, processing can be performed on enhanced depth-of-field (EDOF) image in which all parts of the image are in focus. However, such processing steps may be of limited use in conventional operation on EDOF images, because the depth map accuracy as well as the light field data itself can have strong depth-dependent variation in terms of sampling, prefiltering, and noise level. Processing the entire EDOF output as a single 2D image can result in unwanted artifacts, especially when highly spatially-unstable processing techniques are used in enhancing the image. Accordingly, in at least one embodiment, a layered image processing technique is used.

Lens Flare Correction

As mentioned above, various image processing steps may be used to prevent, remove, and/or mitigate lens flare effects in light-field images. The result may be the provision of a corrected light-field image in which the effects of the lens flare are much less visible. Lens flare correction may be performed automatically and/or with input from the user.

It has been observed that a lens flare often reaches the sensor (for example, the sensor 803 of FIG. 3) from a specific angular direction. Therefore, the flare signal may have a very smooth variation in the angular coordinates across the light-field image. Also, pixels with lens flare may have brighter intensities than neighboring pixels. This can be a useful feature for automatic lens flare detection. The structure of a light-field image, combined with the angular consistency of a lens flare, may facilitate lens flare correction in light-field images, as will be shown and described herein.

Figure 5B:
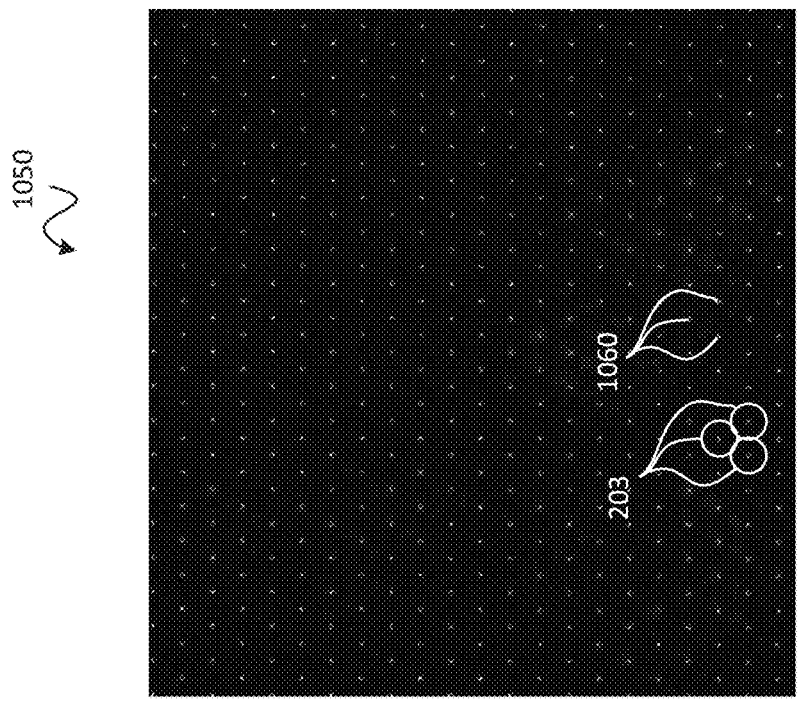
FIG. 5B is a zoomed in portion of a lens flare-affected portion of the light-field image of FIG. 5A.
Figure 5A:
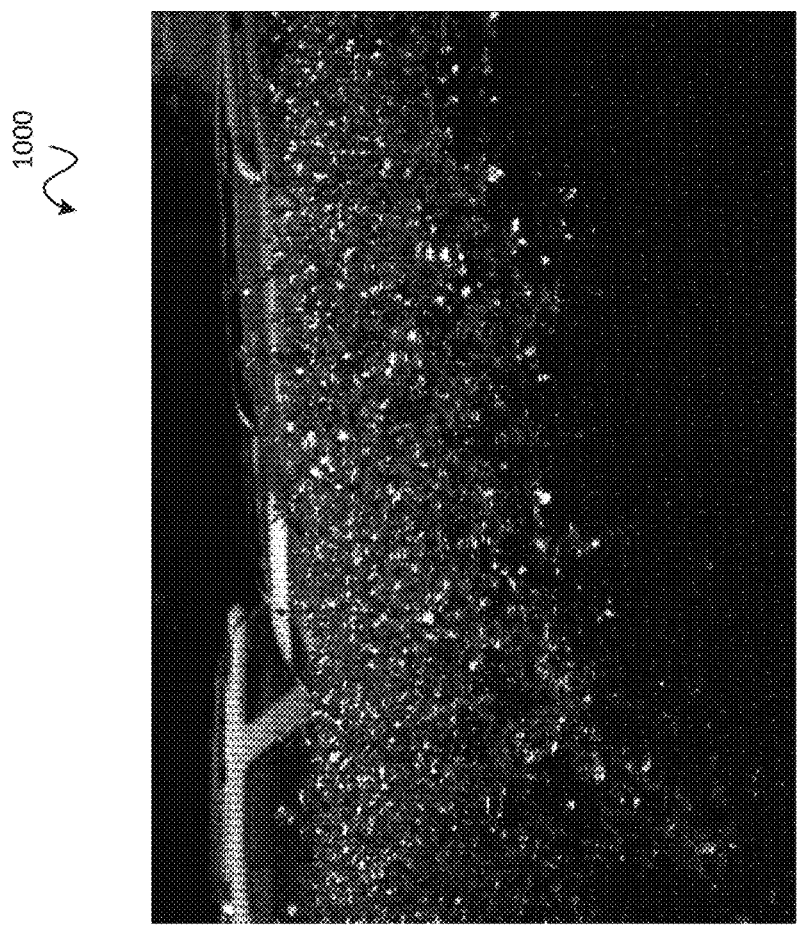
FIG. 5A is an exemplary light-field image affected by lens flare.

FIG. 5A is an exemplary light-field image 1000 affected by lens flare. The light-field image 1000 is in raw, lenslet-based form; accordingly, it has many disks 102 as in FIG. 1. Each of the disks 102 may contain several pixels 203. In FIG. 1, the portion at the lower right-hand side of the light-field image 1000 may most clearly illustrate the effects of lens flare, as each of the disks 102 has one or more pixels that are far brighter than their neighbors.

FIG. 5B is a zoomed in portion of a lens flare-affected portion 1050 of the light-field image 1000 of FIG. 5A. The lens flare-affected portion 1050 may be from the lower right-hand side of the light-field image 1000. The lens flare-affected portion 1050 more clearly illustrates the presence of brighter pixels 1060 within each of the disks 230. The brighter pixels 1060 may be unexpected for viewers who are not accustomed to light-field photography because in traditional photography, lens flare traditionally appears as a continuous halo effect on the image. Hence, the brighter pixels 1060 may undesirably reveal the manner in which the microlens array 802 divides the image based on the spacing of the microlenses in the microlens array 802. Lens flare correction according to the present disclosure may mitigate and/or eliminate the brighter pixels 1060.

Figure 6:
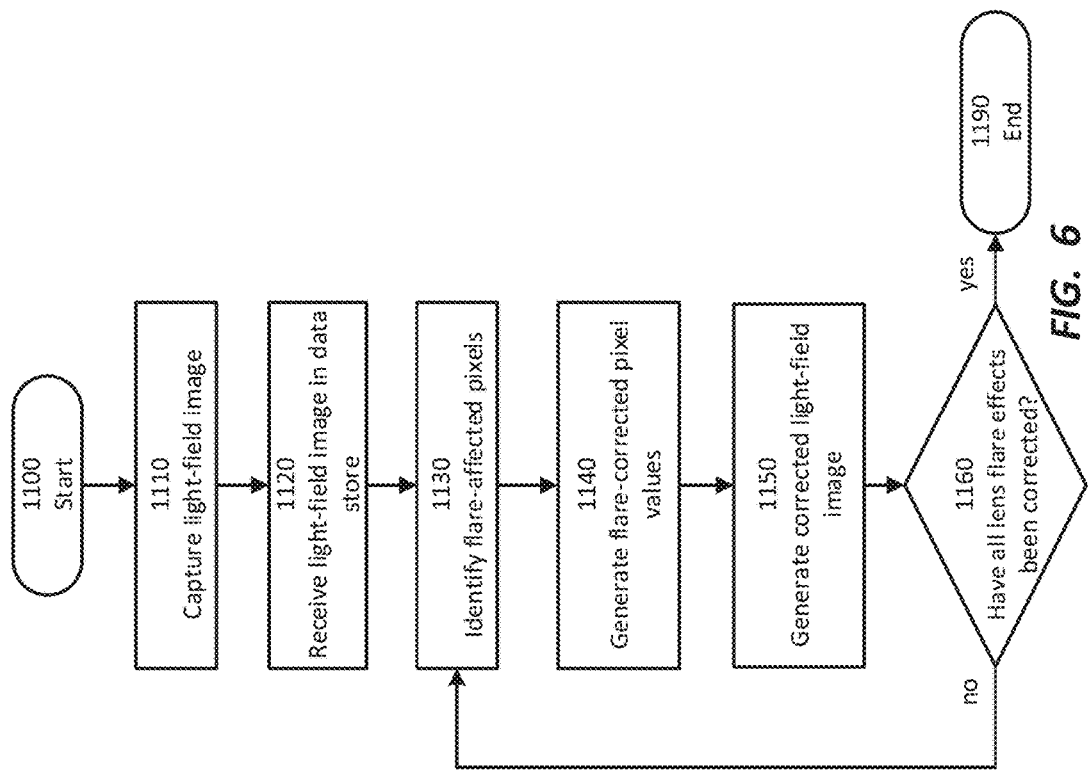
FIG. 6 is a flow diagram depicting a method of carrying out lens flare correction, according to one embodiment.

FIG. 6 is a flow diagram depicting a method of carrying out lens flare correction, according to one embodiment. The method may be performed, for example, with circuitry such as the post-processing circuitry 804 of the camera 800 of FIG. 2 or the post-processing circuitry 804 of FIG. 3, which is independent of the camera 800. In some embodiments, a computing device may carry out the method; such a computing device may include one or more of desktop computers, laptop computers, smartphones, tablets, cameras, and/or other devices that process digital information.

The method may start 1100 with a step 1110 in which a light-field image (such as the light-field image 1000 of FIG. 5A) is captured, for example, by the sensor 803 of the camera 800. Light may pass from the subject 901 through the aperture 812, through the main lens 813 and through the microlens array 802 to be recorded by the sensor 803 as the light-field image 1000. During this process, lens flare effects may occur, and may be captured in the light-field image 1000.

In a step 1120, the light-field image data that defines the light-field image 1000 may be received in a data store, such as the memory 811. The light-field image 1000 may be received in the memory 811 of a computing device, which may be the camera 800 as in FIG. 2. Alternatively, the computing device with memory 811 that receives the light-field image 1000 may be separate from the camera 800 as in FIG. 3, and may be any type of computing device, including but not limited to desktop computers, laptop computers, smartphones, tablets, and the like.

In a step 1130, flare-affected pixels of the light-field image 1000 may be identified. This may entail, for example, identifying certain brighter pixels 1060 of the light-field image 1000, as illustrated in FIGS. 5A and 5B. This may be done in a wide variety of ways within the scope of the present disclosure. Two different identification methods will be discussed in detail herein; these can be used independently or in combination with one another.

The first identification method may involve analysis of small, local areas of the light-field image 1000. The first identification method may utilize the observation described above, that the angular coordinates of the flare-affected pixels will tend to remain relatively constant. Thus, linear modeling may be used to relatively rapidly identify flare-affected pixels, without the need for high-order modeling.

The second identification method may involve the generation of a flare model, which may be an affine model for the four-dimensional (4D) coordinates of the flare-affected pixels. The flare model may be used to refine the set of identified flare-affected pixels by eliminating outliers and/or including flare-affected pixels that were not identified initially.

The first and second identification methods will be discussed in detail subsequently, with reference to FIGS. 7 through 9. Upon completion of the step 1130, a list of the locations (i.e., the coordinates, for example, in the x,y,u,v schema described previously) of the flare-affected pixels may be obtained. In some embodiments, this list may take the form of a probability map indicating the probability that each pixel in the probability map is a flare-affected pixel. The probability map may have various gradations indicating various probability levels for each pixel. Thus, "identifying a flare-affected pixel" does not require making a binary determination that a pixel is or is not flare-affected, but may rather entail determination of a probability that the pixel is flare-affected.

Each of the flare-affected pixels may have a flare-affected pixel value that has been affected by the lens flare. For example, the flare-affected pixel value may be luminance, which may be artificially elevated due to the lens flare, thus causing the flare-affected pixels to appear brighter than surrounding pixels as in FIGS. 5A and 5B.

In a step 1140, flare-corrected pixel values may be generated for the flare-affected pixels. The flare-corrected pixel values may be pixel values that at least partially correct for the effects of the lens flare on the flare-affected pixel values. This may be done in a wide variety of ways within the scope of the present disclosure. Two different correction methods will be discussed in detail herein. Either may be used in combination with either of the identification methods.

The first correction method may involve local linear interpolation, which may be used to provide flare-corrected pixel values based on neighboring pixel values of neighboring pixels proximate each flare-affected pixel. The linear interpolation may be edge-sensitive, so as to preserve the integrity of edges depicted in the light-field image 1000.

The second correction method may utilize the probability descried above, regarding whether pixels of the light-field image 1000 are flare-affected pixels. Pixels with a high probability of being flare-affected pixels may be assigned lower weights in subsequent processing steps. Thus, the flare-corrected pixel values for these flare-affected pixels may be generated in the course of such further processing.

The first and second correction methods will also be discussed in detail subsequently, with reference to FIGS. 7 through 9. Upon completion of the step 1140, a flare-corrected value may be obtained for each of the flare-affected pixels. As indicated previously, identification of a pixel as a flare-affected pixel may entail assigning a probability level to the pixel indicating that the pixel is likely a flare-affected pixel. In some embodiments, the flare-corrected pixel value may differ from the flare-affected value in proportion to the probability level. For example, pixels with a high probability of being flare-affected pixels may have flare-corrected pixel values that differ more dramatically from the flare-affected pixel values.

In a step 1150, the flare-corrected pixel values may be used to generate a corrected light-field image. The corrected light-field image may be the light-field image 1000 with effects of the lens flare at least partially removed. The step 1150 may be carried out in various ways.

According to some embodiments, and in particular, where the probability that each pixel is a flare-affected pixel has not been used in the computation of the flare-corrected values, the flare-affected values and the flare-corrected values may be blended in proportion to the probability to generate the corrected light-field image. For example, for pixels with a high probability of being flare-affected pixels, the final pixel value may be close to the flare corrected pixel values. Conversely, for pixels with a low probability of being flare-affected pixels, the final pixel value may be close to the flare-affected pixel value.

In alternative embodiments, the flare-corrected pixel values may simply be used in place of the flare-affected pixel values for the flare-affected pixels to generate the corrected light-field image. Generation of the corrected light-field image may be done in this manner where the probability was used to generate the flare-corrected pixel values, as in the second correction method.

In a query 1160, a determination may be made as to whether all of the lens flare effects have been corrected to the desired degree. The query may be carried out in various ways. In some examples, the query 1160 may be carried out automatically by performing the step 1130 again, or by performing a similar step in which flare-affected pixels are automatically identified. If the number and/or probability of flare-affected pixels exceeds a predetermined threshold, then the query 1160 may be answered in the negative.

Additionally or alternatively, the query 1160 may function through the use of user input. For example, the corrected light-field image may be shown to the user, and the user may indicate that the lens flare in the corrected light-field image has or has not been sufficiently corrected.

If the query 1160 is answered in the negative, the method may return to the step 1130. Alternatively, if the step 1130 was performed as part of determining that the query 1160 was answered in the negative, the method may instead return to the step 1140, and may proceed to generate flare-corrected pixel values for the flare-affected pixels identified in the process of answering the query 1160. In either case, the corrected light-field image may be taken as an intermediate light-field image that will undergo further processing for lens flare correction. In the step 1150, a new corrected light-field image may be generated, and the query 1160 may once again be performed to determine whether the lens flare effects have been sufficiently corrected and/or removed. Once the query 1160 is answered in the affirmative, the method may end 1190.

The method of FIG. 6 is only one of many possible methods that may be used to prevent, remove, and/or mitigate lens flare effects in a light-field image. According to various alternatives, various steps of FIG. 6 may be carried out in a different order, omitted, and/or replaced by other steps. Further, various other image enhancement processes may be performed before, after between, and/or in conjunction with the steps of FIG. 6.

The method may help reduce and/or eliminate lens flare effects from the final image viewed by the user. Thus, the method may provide for a scene that appears, to the user, to be a more accurate representation of the subject matter captured in the light-field image. The various steps of FIG. 6 will be further described in connection with FIGS. 7A-10F, as follows.

First Identification Method

As indicated previously, the first identification method may involve analysis of small, local areas of the light-field image 1000. Thus, the first identification method may utilize an algorithm in which the light-field image is first separated into small, non-overlapping tiles. The tiles may be arranged in a two-dimensional rectangular grid pattern. The tiles may be square, rectangular, or any other shape; they may be the same size as one another or different sizes.

Figure 7:
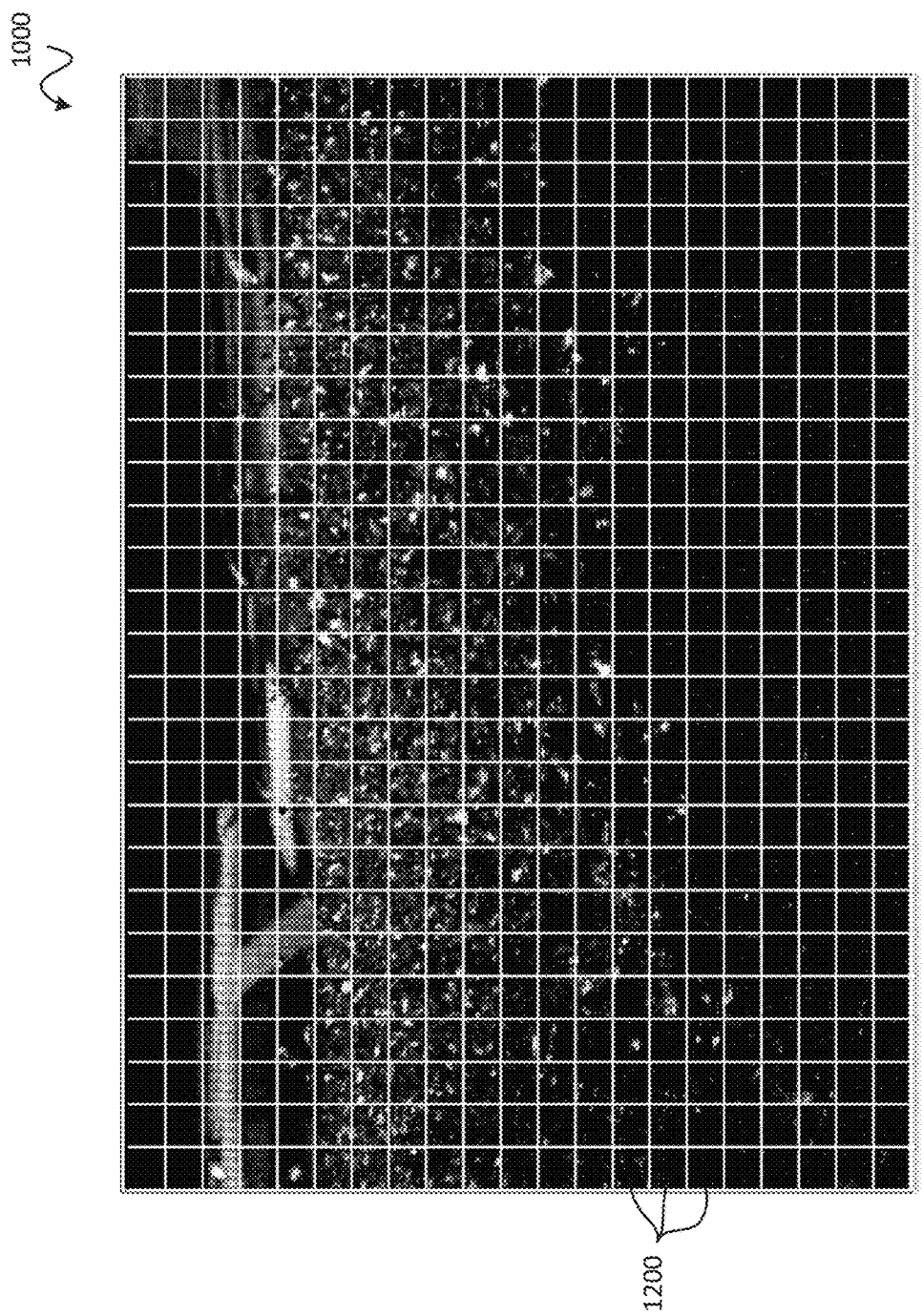
FIG. 7 is the light-field image of FIG. 5A, divided into tiles to facilitate identification of flare-affected pixels.

FIG. 7 depicts the light-field image 1000 of FIG. 5A, divided into tiles 1200 to facilitate identification of flare-affected pixels. The tiles 1200 may be non-overlapping, and may be arranged in a rectangular grid pattern as indicated above. If desired, each of the tiles 1200 may be sized so that each of the tiles 1200 contains the pixels corresponding to approximately one of the microlenses of the microlens array 802 (as shown in FIG. 4). Additionally or alternatively, each of the tiles 1200 may be sized to capture the pixels of more than one, or less than one, of the microlenses. By way of example, the tiles 1200 of FIG. 7 are arranged in a 26×21 grid array.

For each of the tiles 1200, the flare-affected pixels may be identified by comparing their pixel values to those of neighboring pixels. An algorithm used to accomplish this may first detect the maximum value pixels. A maximum value pixel may have a pixel value that is a local maximum, i.e., higher than pixel values of neighboring pixels. The pixel at i may be a maximum value pixel if the following conditions hold:

$$\forall j \in \Omega_i, i \neq j, P_i - P_j > T_d, P_i > T_p \qquad (1)$$

where $P_i$ is the pixel value of i, $\Omega_i$ is a local window centered around pixel i, and $T_d$ and $T_p$ are constant thresholds. Since a lens flare may corrupt more than one pixel, the pixels around a maximum value pixel are also possible flare-affected pixels. The locations of all possible flare-affected pixels may be recorded in the form of list, map, or the like.

For each of the potential flare-affected pixels, the algorithm may further analyze the pixel coordinates in the four-dimensional light-field image 1000 to build a flare model. Here, (x,y) may be used to represent the spatial coordinate, and (u,v) may be used to represent the angular coordinate. In each of the tiles 1200, the flare may be modeled using the mean values of the angular coordinates of the potential flare-affected pixels in the tile 1200. This modeling may utilize an assumption that the angular variation of the flare is relatively constant in a small local area. Thus, the flare-affected pixels in a confined portion of the light-field image 1000 may be expected to have (u,v) coordinates that are similar to each other.

The result may be generation of a grid of flare models, one for each of the tiles 1200, which may be used in conjunction with the list of potential flare-affected pixels. In order to further improve the smoothness of the model, all neighboring models may be used to determine the probability that a potential flare-affected pixel in a given tile is actually a flare-affected pixel.

Figure 8:
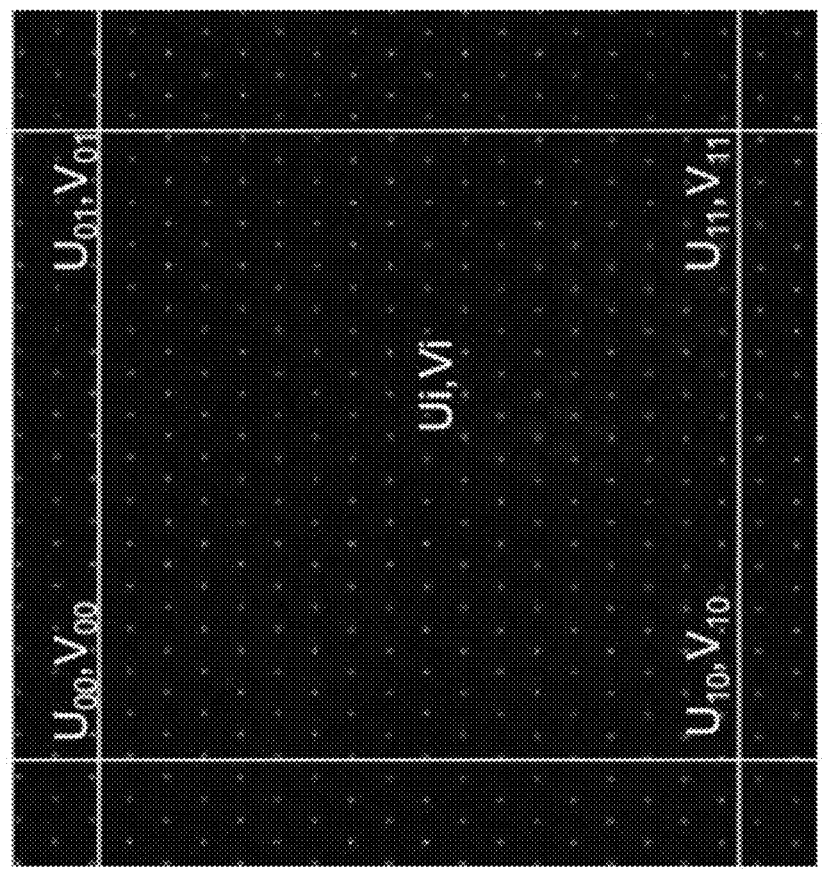
FIG. 8 is the zoomed in portion of FIG. 5B, illustrating the use of bilinear interpolation to calculate the coordinate of a flare pixel.

FIG. 8 is the zoomed in lens flare-affected portion 1050 of FIG. 5B, illustrating the use of bilinear interpolation to calculate the coordinates of a potential flare-affected pixel. Specifically, for each potential flare-affected pixel, a bilinear interpolation of the four neighboring models may be used to yield an estimate of the flare coordinates $(u_i, v_i)$ or the coordinates where one or more flare-affected pixels are expected to be found. In FIG. 8, $(u_i, v_i)$ is the estimate and $\{(U_{ab}, V_{ab}) - a = \{0,1\}, b = \{0,1\}\}$ are the models of the four nearest tiles 1200 to the pixel.

Then, the discrepancy between the flare coordinates calculated by interpolation and the actual coordinates of the potential flare-affected pixel may be used to obtain the probability that the potential flare-affected pixel is actually a flare-affected pixel:

$$p_i = f(\sqrt{(u-u_i)^2 + (v-v_i)^2}). \qquad (2)$$

where (u,v) are the actual light-field coordinates of the potential flare-affected pixel i, and $(u_i, v_i)$ are estimated light-field coordinates from interpolation of the flare models, $p_i$ is the probability that pixel i is a flare-affected pixel, and f is a decreasing function. Many different functions may be use for f; in some examples f may be a mono-decreasing function (e.g. linear function or Gaussian function).

Figure 9:
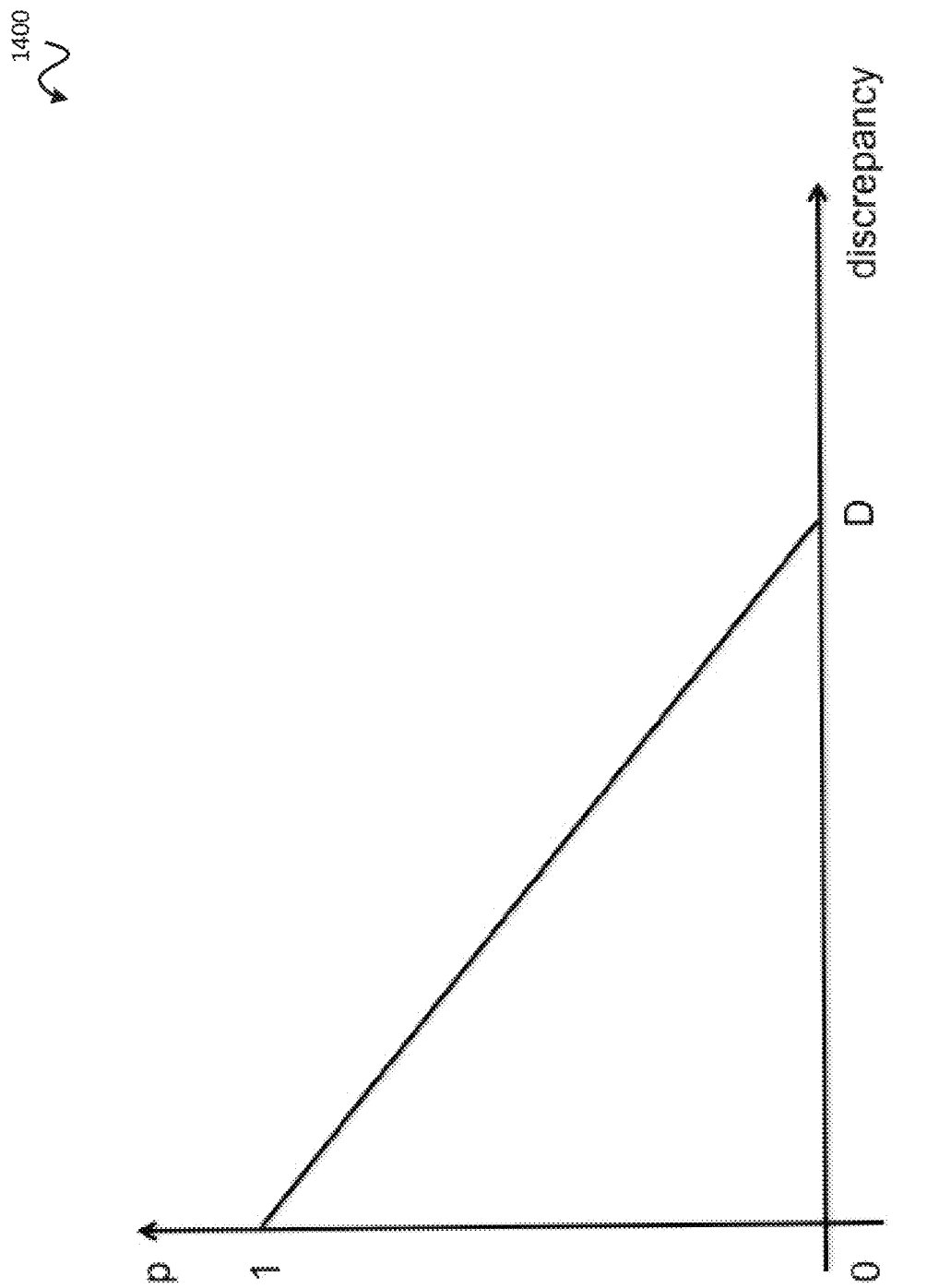
FIG. 9 is a graph illustrating a linear function illustrating calculation of the probability that a maximum value pixel is a flare affected pixel based on the discrepancy between modeled flare coordinates and the actual coordinates of the maximum value pixel.

FIG. 9 is a graph 1400 illustrating a linear function illustrating calculation of the probability that a maximum value pixel is a flare affected pixel based on the discrepancy between modeled flare coordinates and the actual coordinates of the maximum value pixel. FIG. 9 provides an example of a linear mono-decreasing function, which may be used for f in (2) above. Thus, the probability may decrease linearly with increasing discrepancy between the actual and modeled coordinates of a potential flare-affected pixel, such as a maximum value pixel.

Second Identification Method

As indicated previously, the second identification method may involve the generation of a flare model, which may be an affine model for the four-dimensional (4D) coordinates of the flare-affected pixels of the light-field image 1000. The second identification method may also commence with detection of maximum value pixels, which may be brighter pixels 1060 as in FIG. 5B, as potential flare-affected pixels. This may be carried out as in the first identification method.

After the potential flare-affected pixels have been identified, instead of splitting the light field image 1000 into tiles 1200 as in the first identification method, a global parametric flare model may be generated. The global parametric flare model may be fitted to the lens flare based on the locations of the potential flare-affected pixels. Specifically, it may be assumed that the coordinates of flare-affected pixels follow a simple affine model:

$$u_i = c_0 x_i + c_1 y_i + c_2, \quad (3)$$

$$v_i = c_3 x_i + c_4 y_i + c_5, \quad (4)$$

where $(x_i, y_i, u_i, v_i)$ is the 4D light field coordinate of pixel i, and $\{c_0, c_1, c_2, c_3, c_4, c_5\}$ are the model parameters to be estimated. Because the potential flare-affected pixels may contain outliers from the true bright objects, a robust estimation procedure may be customized to estimate the parameters. In alternative embodiments, other algorithms may instead be used to ascertain the parameters of the model.

Once the global parametric flare model has been generated and fitted to the locations of the potential flare-affected pixels, the probability that each of the potential flare-affected pixels is a flare-affected pixel may be obtained, for example, as in (2) above. However, in the second identification method, the estimate of $(u_i, v_i)$ may come from (3) and (4) above, rather than from individual models for the tiles 1200.

First Correction Method

As indicated previously, the first correction method may involve local linear interpolation, which may be used to provide the flare-corrected pixel values based on neighboring pixel values of neighboring pixels proximate each flare-affected pixel of the light-field image 1000. A flare-corrected pixel value for a flare-affected pixel may be recovered from the interpolation of its neighboring pixels based on the local gradient information. While various interpolation algorithms may be used, the following may be advantageous:

$$O_i = p_i * I_i + (1 - p_i) * p_i, \quad (5)$$

$$I_i = \begin{cases} I_H, & \text{if } |G_V| - |G_H| > T_G \\ I_V, & \text{if } |G_H| - |G_V| > T_G \\ \frac{I_H + I_V}{2}, & \text{otherwise} \end{cases} \quad (6)$$

Here, $I_H$ and $I_V$ are the interpolation results along horizontal and vertical directions, respectively, and $G_H$ and $G_V$ are the gradients along the horizontal and vertical directions, respectively. The flare-affected pixels may be excluded for both the interpolation and gradient calculation. $T_G$ is a constant threshold.

In some embodiments, the interpolation may be carried out in an edge-aware manner, i.e., in such a manner that the integrity of edges depicted in the light-field image 1000 will not be adversely affected by lens flare correction. Thus, if the flare-affected pixel is on or around an edge depicted in the light-field image 1000, the interpolation may be carried out exclusively along the edge instead of crossing the edge to avoid aliasing artifacts. Accordingly, for a lens-affected pixel on the edge, only neighboring pixels that are also on the edge may be used for the interpolation.

As mentioned previously, in the step 1150, the final pixel value for each flare-affected pixel may be computed by blending the corrected pixel value with the flare-affected pixel value for the flare-affected pixel. The corrected pixel value and the flare-affected pixel value may be blended in proportion to the probability computed in (2). Potential flare-affected pixels that do not follow the flare model may be assigned a low probability of being flare-affected pixels; accordingly, little or no correction may be applied to such potential flare pixels as the corrected light-field image is generated.

Second Correction Method

As indicated previously, the second correction method may utilize the probability computed in (2) above in conjunction with one or more further processing steps. Instead of using interpolation to correct flare-affected pixels, the second correction method may label flare-affected pixels so that they can be downweighted and/or excluded in the following processing. In some embodiments, a binary label may be applied by simply indicating which pixels have been identified as flare-affected pixels; these pixels may then be excluded from further processing. In other embodiments, a more flexible soft labeling method may be used.

Specifically, a weight may be assigned to each potential flare-affected pixel. In one example, the pixel weights may range from 0 to 1.0, with 1.0 being the weight for a pixel that is believed to have no probability of having been affected by lens flare. The weight may be inversely proportional to the probability that the potential flare-affected pixel is a flare-affected pixel. By way of example, the following formula may advantageously be used:

$$w_i = 1 - p_i. \quad (7)$$

where $p_i$ is given in (2) above.

This weight may be used in a wide variety of processes, many of which may tend to reduce the pixel value of low-weighted pixels, thereby naturally applying correction to flare-affected pixels. For example, in a projection process, each pixel may be modulated by its weight. Corrected pixel values may be provided in the course of such processing by virtue of the weight applied, based on the probability that each pixel is a flare-affected pixel.

Variations

As indicated previously, the method steps set forth above are merely exemplary. Many variations would be contemplated by a person of skill in the art with the aid of the present disclosure.

One such variation is the inclusion of user input in the method of FIG. 6. For example, the user may use the user input 815 of FIG. 3 and/or a corresponding component of the camera 800 to supply one or more parameters that guide performance of the step 1130, the step 1140, the step 1150, and/or the query 1160.

In some embodiments, the user may designate a subset of the light-field image 1000 that is to be processed for lens flare correction. Any known selection method, such as a window, lasso, or the like, may be used to designate the subset. This subset may be used in the performance of the step 1130, the step 1140, the step 1150, and/or the query 1160. Conversely, portions of the light-field image outside the subset may not be processed in these steps. Thus, computation time for the method may be reduced.

In other embodiments, the user may designate other parameters that set various thresholds or other settings utilized in the performance of the step 1130, the step 1140, the step 1150, and/or the query 1160. For example, the user may set the threshold used in identification of flare-affected pixels, the threshold used in edge interpolation, the shape of the probability function f, and/or the parameters in the robust flare model of the second identification method. The user may thus specify the amount of flare correction to be carried out.

In further embodiments, the user may determine when the method of FIG. 6 is complete. This may be done, for example, by answering the query 1160 of FIG. 6 affirmatively if lens flare correction is satisfactory, or negatively if further correction is needed.

Further, in some embodiments, the method of FIG. 6 may be used to correct the effects of multiple lens flares, which may originate from different light sources. In some embodiments, correction of a first lens flare may lead to the generation of an intermediate light-field image. With the effects of the first lens flare mitigated and/or removed, detection of flare-affected pixels affected by a second lens flare may be facilitated. Thus, performance of multiple iterations of the step 1130, the step 1140, the step 1150, and/or the query 1160 may help to correct for multiple lens flares.

Results

FIGS. 10A through 10F illustrate results that may be obtained by performing the method of FIG. 6 on the light-field image of FIG. 1A. Generally, flare-affected pixels may be identified by the performance of the first identification method or the second identification method, with the possibility of identifying some outliers as potential flare-affected pixels. The outliers may be removed in the probability calculation, and the flare-affected pixel values may be corrected pursuant to the first correction method or the second correction method.

Figure 10A:
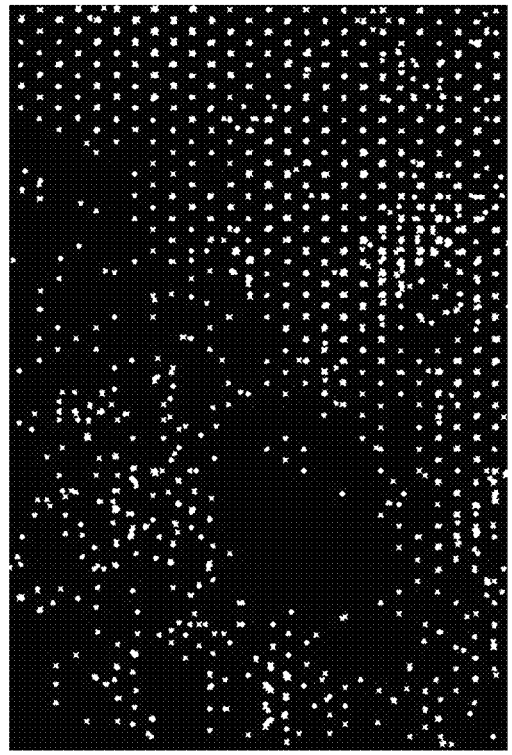
FIG. 10A is a light-field image before processing to correct lens flare.

Specifically, FIG. 10A is a light-field image 1500 before processing to correct lens flare. The light-field image 1500 may be a subset of the light-field image 1000 of FIG. 5A.

Figure 10B:
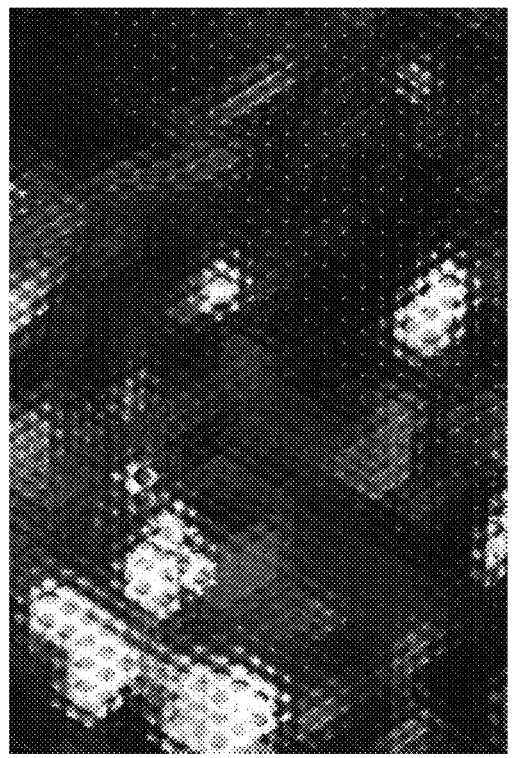
FIG. 10B is a map of the maximum value pixels of the light-field image of FIG. 10A, as identified by a first identification method.

FIG. 10B is a map 1510 of the maximum value pixels of the light-field image 1500 of FIG. 10A. The map 1510 may be generated pursuant to the first identification method described above.

Figure 10D:
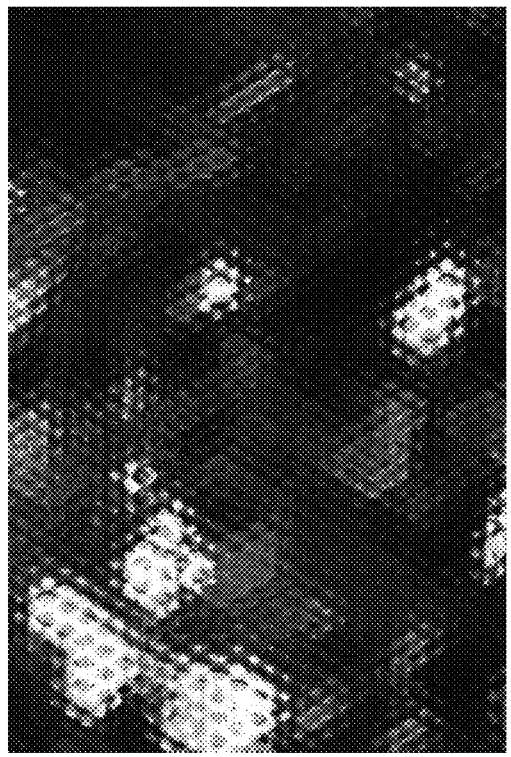
FIG. 10D is a corrected light-field image obtained by processing the light-field image of FIG. 10A to correct for lens flare, according to a first correction method.
Figure 10C:
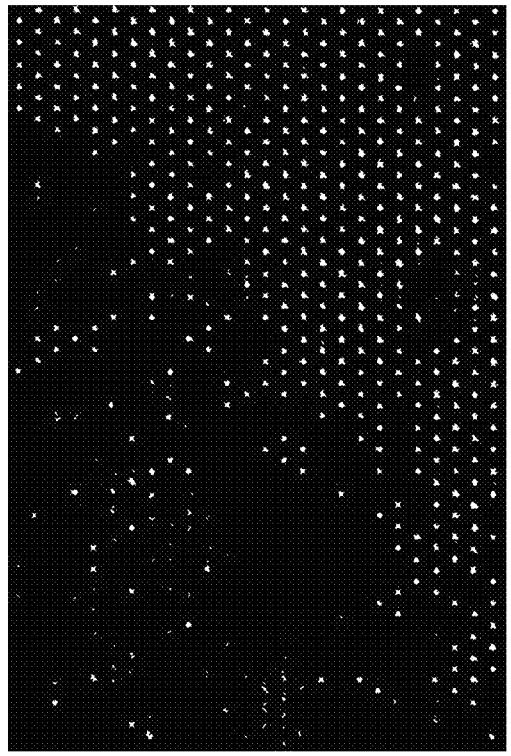
FIG. 10C is a map of the probability that each of the pixels of FIG. 10A is a flare-affected pixel, as obtained through the first identification method.

FIG. 10C is a map 1520 of the probability that each of the pixels of the light-field image 1500 of FIG. 10A is a flare-affected pixel. The map 1520 may be obtained through the first identification method described above.

FIG. 10D is a corrected light-field image 1530 obtained by processing the light-field image 1500 of FIG. 10A to correct for lens flare. The corrected light-field image 1530 may be obtained via application of the first correction method described above.

Figure 10F:
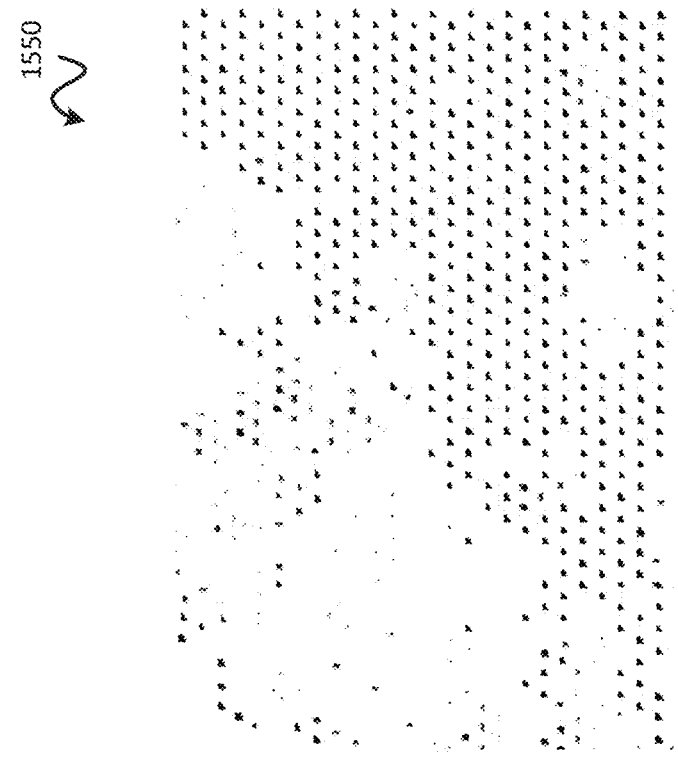
FIG. 10F is a map of the pixel weights of the light-field image of FIG. 10A, according to a second correction method.
Figure 10E:
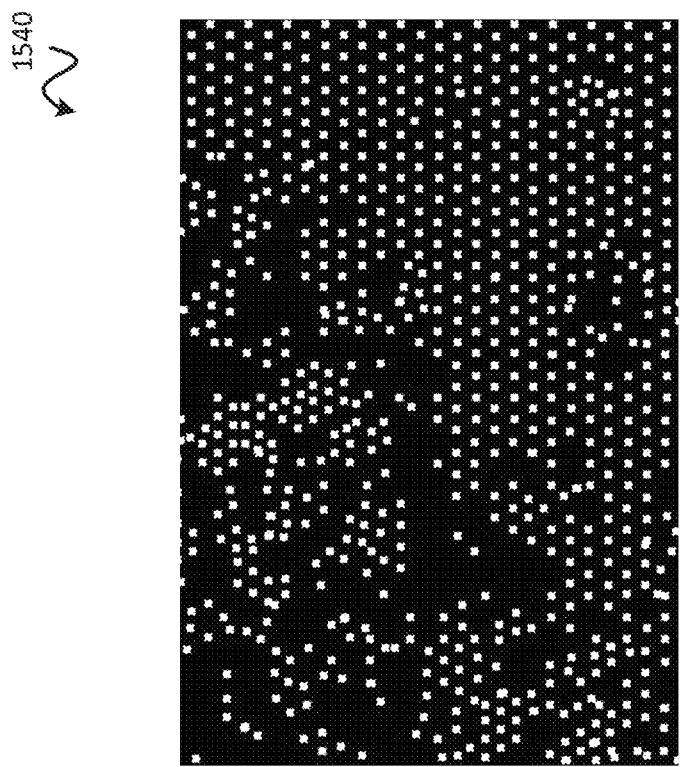
FIG. 10E is a map of the maximum value pixels of the light-field image of FIG. 10A, as identified by a second identification method.

FIG. 10E is a map 1540 of the maximum value pixels of the light-field image of FIG. 10A. The map 1540 may be generated by applying the second identification method described above.

FIG. 10F is a map 1550 of the pixel weights of the light-field image of FIG. 10A. The map 1550 may be used to carry out the second correction method described above.

FIG. 11A is a light-field image 1600 before processing to correct for lens flare. Lens flare effects can be seen in the form of bright spots like the brighter pixels 1060 of FIG. 5B.

FIG. 11B is a corrected light-field image 1610 generated by application of the first identification method and the first correction method described above to the light-field image 1600 of FIG. 11A. The bright spots have been substantially eliminated.

FIG. 11C is a corrected light-field image 1620 generated by applying the second identification method and the second correction method described above to the light-field image 1600 of FIG. 11A. Again, the bright spots have been substantially eliminated.

The above description and referenced drawings set forth particular details with respect to possible embodiments. Those of skill in the art will appreciate that the techniques described herein may be practiced in other embodiments. First, the particular naming of the components, capitalization of terms, the attributes, data structures, or any other programming or structural aspect is not mandatory or significant, and the mechanisms that implement the techniques described herein may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some embodiments may include a system or a method for performing the above-described techniques, either singly or in any combination. Other embodiments may include a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions of described herein can be embodied in software, firmware and/or hardware, and when embodied in software, can be downloaded to reside on and be operated from different platforms used by a variety of operating systems.

Some embodiments relate to an apparatus for performing the operations described herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), and/or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the techniques set forth herein are not described with reference to any particular programming language. It will be appreciated that a variety of programming languages may be used to implement the techniques described herein, and any references above to specific languages are provided for illustrative purposes only.

Accordingly, in various embodiments, the techniques described herein can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the techniques described herein include: a mobile phone, personal digital assistant, smartphone, kiosk, server computer, enterprise computing device, desktop computer, laptop computer, tablet computer, consumer electronic device, television, set-top box, or the like. An electronic device for implementing the techniques described herein may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

In various embodiments, the techniques described herein can be implemented in a distributed processing environment, networked computing environment, or web-based computing environment. Elements can be implemented on client computing devices, servers, routers, and/or other network or non-network components. In some embodiments, the techniques described herein are implemented using a client/server architecture, wherein some components are implemented on one or more client computing devices and other components are implemented on one or more servers. In one embodiment, in the course of implementing the techniques of the present disclosure, client(s) request content from server(s), and server(s) return content in response to the requests. A browser may be installed at the client computing device for enabling such requests and responses, and for providing a user interface by which the user can initiate and control such interactions and view the presented content.

Any or all of the network components for implementing the described technology may, in some embodiments, be communicatively coupled with one another using any suitable electronic network, whether wired or wireless or any combination thereof, and using any suitable protocols for enabling such communication. One example of such a network is the Internet, although the techniques described herein can be implemented using other networks as well.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:

1. A method for correcting a light-field image to remove effects of a first lens flare, the method comprising:
   in a data store, receiving the light-field image after the light-field image has been captured by a light-field image capture device having a sensor and a plurality of microlenses;
   in a processor, identifying a plurality of flare-affected pixels of the light-field image that have been affected by the first lens flare, wherein the flare-affected pixels have flare-affected pixel values, wherein identifying the plurality of flare-affected pixels of the light-field image comprises:
   identifying a plurality of maximum value pixels, each of which has a pixel value higher than neighboring pixel values of neighboring pixels;
   generating a global parametric flare model of effects of the first lens flare based on locations of the maximum value pixels; and
   using the global parametric flare model to compute a probability that the pixel value of each of the maximum value pixels has been affected by the first lens flare;
   in the processor, generating flare-corrected pixel values for the flare-affected pixels, wherein, relative to the flare-affected pixel values, the flare-corrected pixel values at least partially remove effects of the first lens flare; and
   in the processor, using the flare-corrected pixel values to generate a corrected light-field image in which effects of the first lens flare are at least partially corrected.

2. The method of claim 1, wherein generating the global parametric flare model of effects of the first lens flare based on locations of the maximum value pixels comprises generating a simple affine model that is predictive of the locations of the maximum value pixels.

3. The method of claim 1, wherein generating flare-corrected pixel values for the flare-affected pixels comprises, for each of the flare-affected pixels, using neighboring pixel values to interpolate the flare-corrected pixel value for the flare-affected pixel.

4. The method of claim 3, wherein generating flare-corrected pixel values for the flare-affected pixels further comprises:
identifying at least one edge-located pixel of the flare-affected pixels, wherein each edge-located pixel is located proximate an edge depicted in the light-field image; and
identifying a plurality of edge-located neighboring pixels that are located proximate the edge;
wherein, for each of the edge-located pixels, using the neighboring pixel values to interpolate the flare-corrected pixel value comprises using exclusively the neighboring pixel values of the edge-located neighboring pixels to interpolate the flare-corrected pixel value.

5. The method of claim 1, wherein using the flare-corrected pixel values to generate a corrected light-field image comprises, for each of the flare-affected pixels, blending the flare-affected pixel value with the flare-corrected pixel value, with the flare-corrected pixel value weighted in proportion to the probability that the pixel value of the maximum value pixel has been affected by the first lens flare.

6. The method of claim 1, wherein generating flare-corrected pixel values for the flare-affected pixels comprises, for each of the maximum value pixels, assigning a weight, inversely proportional to the probability that the pixel value of the maximum value pixel has been affected by the first lens flare;
wherein generating the flare-corrected pixel values comprises processing the light-field image with at least one process in which each of the flare-affected pixels is excluded from processing in proportion to the weight assigned to it to obtain the flare-corrected pixel values.

7. The method of claim 1, wherein using the flare-corrected pixel values to generate the corrected light-field image comprises:
using the flare-corrected pixel values to generate an intermediate light-field image in which effects of the first lens flare are at least partially corrected;
identifying a plurality of intermediate flare-affected pixels of the intermediate light-field image that have been affected by a selection from the group consisting of the first lens flare and a second lens flare, wherein the intermediate flare-affected pixels have intermediate flare-affected pixel values;
generating intermediate flare-corrected pixel values for the intermediate flare-corrected pixels, wherein, relative to the intermediate flare-affected pixel values, the intermediate flare-corrected pixel values at least partially remove effects of the selection; and
using the intermediate flare-corrected pixel values to generate the corrected light-field image.

8. The method of claim 7, wherein the selection comprises the second lens flare.

9. The method of claim 1, further comprising, in the processor, prior to identifying the plurality of flare-affected pixels, at an input device, receiving user input comprising a parameter;
wherein at least one of identifying the plurality of flare-affected pixels, generating the flare-corrected pixel values for the flare-affected pixels, and using the flare-corrected pixel values to generate the corrected light-field image comprises using the parameter.

10. The method of claim 9, wherein the parameter comprises a designation of a subset of the light-field image;
wherein using the parameter comprises identifying the plurality of flare-affected pixels exclusively within the subset.

11. A non-transitory computer-readable medium for correcting a light-field image to remove effects of a first lens flare, comprising instructions stored thereon, that when executed by a processor, perform the steps of:
causing a data store to receive the light-field image after the light-field image has been captured by a light-field image capture device having a sensor and a plurality of microlenses;
identifying a plurality of flare-affected pixels of the light-field image that have been affected by the first lens flare, wherein the flare-affected pixels have flare-affected pixel values, wherein identifying the plurality of flare-affected pixels of the light-field image comprises:
identifying a plurality of maximum value pixels, each of which has a pixel value higher than neighboring pixel values of neighboring pixels;
generating a global parametric flare model of effects of the first lens flare based on locations of the maximum value pixels; and
using the global parametric flare model to compute a probability that the pixel value of each of the maximum value pixels has been affected by the first lens flare;
wherein generating the global parametric flare model of effects of the first lens flare based on locations of the maximum value pixels comprises generating a simple affine model that is predictive of the locations of the maximum value pixels;
generating flare-corrected pixel values for the flare-affected pixels, wherein, relative to the flare-affected pixel values, the flare-corrected pixel values at least partially remove effects of the first lens flare; and
using the flare-corrected pixel values to generate a corrected light-field image in which effects of the first lens flare are at least partially corrected.

12. The non-transitory computer-readable medium of claim 11, wherein generating flare-corrected pixel values for the flare-affected pixels comprises, for each of the flare-affected pixels, using neighboring pixel values to interpolate the flare-corrected pixel value for the flare-affected pixel.

13. The non-transitory computer-readable medium of claim 12, wherein generating flare-corrected pixel values for the flare-affected pixels further comprises:
identifying at least one edge-located pixel of the flare-affected pixels, wherein each edge-located pixel is located proximate an edge depicted in the light-field image; and
identifying a plurality of edge-located neighboring pixels that are located proximate the edge;
wherein, for each of the edge-located pixels, using the neighboring pixel values to interpolate the flare-corrected pixel value comprises using exclusively the neighboring pixel values of the edge-located neighboring pixels to interpolate the flare-corrected pixel value.

14. The non-transitory computer-readable medium of claim 11, wherein generating flare-corrected pixel values for the flare-affected pixels comprises, for each of the maximum value pixels, assigning a weight, inversely proportional to the probability that the pixel value of the maximum value pixel has been affected by the first lens flare;

wherein generating the flare-corrected pixel values comprises processing the light-field image with at least one process in which each of the flare-affected pixels is excluded from processing in proportion to the weight assigned to it to obtain the flare-corrected pixel values.

15. The non-transitory computer-readable medium of claim 11, wherein using the flare-corrected pixel values to generate the corrected light-field image comprises:
using the flare-corrected pixel values to generate an intermediate light-field image in which effects of the first lens flare are at least partially corrected;
identifying a plurality of intermediate flare-affected pixels of the intermediate light-field image that have been affected by a second lens flare, wherein the intermediate flare-affected pixels have intermediate flare-affected pixel values;
generating intermediate flare-corrected pixel values for the intermediate flare-corrected pixels, wherein, relative to the intermediate flare-affected pixel values, the intermediate flare-corrected pixel values at least partially remove effects of the second lens flare; and
using the intermediate flare-corrected pixel values to generate the corrected light-field image.

16. The non-transitory computer-readable medium of claim 11, further comprising instructions stored thereon, that when executed by a processor, perform the steps of, prior to identifying the plurality of flare-affected pixels causing an input device to receive user input comprising a parameter;
wherein at least one of identifying the plurality of flare-affected pixels, generating the flare-corrected pixel values for the flare-affected pixels, and using the flare-corrected pixel values to generate the corrected light-field image comprises using the parameter.

17. A system for correcting a light-field image to remove effects of a first lens flare, the system comprising:
a data store configured to receive the light-field image after the light-field image has been captured by a light-field image capture device having a sensor and a plurality of microlenses; and
a processor, communicatively coupled to the data store, configured to:
identify a plurality of flare-affected pixels of the light-field image that have been affected by the first lens flare, wherein the flare-affected pixels have flare-affected pixel values, wherein the processor is configured to identify the plurality of flare-affected pixels of the light-field image by:
identifying a plurality of maximum value pixels, each of which has a pixel value higher than neighboring pixel values of neighboring pixels;
generating a global parametric flare model of effects of the first lens flare based on locations of the maximum value pixels; and
using the global parametric flare model to compute a probability that the pixel value of each of the maximum value pixels has been affected by the first lens flare; and
wherein the processor is further configured to generate the global parametric flare model of effects of the first lens flare based on locations of the maximum value pixels by generating a simple affine model that is predictive of the locations of the maximum value pixels;
generate flare-corrected pixel values for the flare-affected pixels, wherein, relative to the flare-affected pixel values, the flare-corrected pixel values at least partially remove effects of the first lens flare; and
use the flare-corrected pixel values to generate a corrected light-field image in which effects of the first lens flare are at least partially corrected.

18. The system of claim 17, wherein the processor is further configured to generate the flare-corrected pixel values for the flare-affected pixels by, for each of the flare-affected pixels, using neighboring pixel values to interpolate the flare-corrected pixel value for the flare-affected pixel.

19. The system of claim 18, wherein the processor is further configured to generate the flare-corrected pixel values for the flare-affected pixels by:
identifying at least one edge-located pixel of the flare-affected pixels, wherein each edge-located pixel is located proximate an edge depicted in the light-field image; and
identifying a plurality of edge-located neighboring pixels that are located proximate the edge;
wherein, for each of the edge-located pixels, the processor is further configured to use using the neighboring pixel values to interpolate the flare-corrected pixel value by using exclusively the neighboring pixel values of the edge-located neighboring pixels to interpolate the flare-corrected pixel value.

20. The system of claim 17, wherein the processor is further configured to generate flare-corrected pixel values for the flare-affected pixels by, for each of the maximum value pixels, assigning a weight, inversely proportional to the probability that the pixel value of the maximum value pixel has been affected by the first lens flare;
wherein the processor is further configured to generate the flare-corrected pixel values by processing the light-field image with at least one process in which each of the flare-affected pixels is excluded from processing in proportion to the weight assigned to it to obtain the flare-corrected pixel values.

21. The system of claim 17, wherein the processor is further configured to use the flare-corrected pixel values to generate the corrected light-field image by:
using the flare-corrected pixel values to generate an intermediate light-field image in which effects of the first lens flare are at least partially corrected;
identifying a plurality of intermediate flare-affected pixels of the intermediate light-field image that have been affected by a second lens flare, wherein the intermediate flare-affected pixels have intermediate flare-affected pixel values;
generating intermediate flare-corrected pixel values for the intermediate flare-corrected pixels, wherein, relative to the intermediate flare-affected pixel values, the intermediate flare-corrected pixel values at least partially remove effects of the second lens flare; and
using the intermediate flare-corrected pixel values to generate the corrected light-field image.

22. The system of claim 17, further comprising an input device configured to, prior to identification of the plurality of flare-affected pixels, receive user input comprising a parameter;
wherein the processor is further configured to carry out at least one of identifying the plurality of flare-affected pixels, generating the flare-corrected pixel values for the flare-affected pixels, and using the flare-corrected pixel values to generate the corrected light-field image by using the parameter.

* * * * *

UNITED STATES PATENT AND TRADEMARK OFFICE
CERTIFICATE OF CORRECTION

PATENT NO. : 10,205,896 B2
APPLICATION NO. : 15/967076
DATED : February 12, 2019
INVENTOR(S) : Jiangtao Kuang and Chia-Kai Liang It is certified that error appears in the above-identified patent and that said Letters Patent is hereby corrected as shown below:

In the Claims

At Column 22 Line 19, correct "configured to use using the" to be --configured to use the--

Signed and Sealed this
Nineteenth Day of November, 2019

Andrei Iancu
*Director of the United States Patent and Trademark Office*